United States Patent [19]

Kondo

[11] Patent Number: 5,047,916
[45] Date of Patent: Sep. 10, 1991

[54] METHOD AND APPARATUS OF FREE SPACE ENUMERATION FOR COLLISION AVOIDANCE

[75] Inventor: Koichi Kondo, Yokohama, Japan

[73] Assignee: Kabushiki Kaisha Toshiba, Kawasaki, Japan

[21] Appl. No.: 328,682

[22] Filed: Mar. 24, 1989

[30] Foreign Application Priority Data

Mar. 25, 1988 [JP] Japan .................. 63-69832
Mar. 25, 1988 [JP] Japan .................. 63-69833
Jul. 21, 1988 [JP] Japan .................. 63-180304

[51] Int. Cl.$^5$ .............................. G06F 15/20
[52] U.S. Cl. .................. 364/167.01; 364/461; 364/513
[58] Field of Search ............ 364/513, 461, 474.2, 364/167.01; 901/1, 50; 318/568.12, 587

[56] References Cited

U.S. PATENT DOCUMENTS

| | | | |
|---|---|---|---|
| 4,578,757 | 3/1986 | Stark | 364/513 X |
| 4,764,873 | 8/1988 | Libby | 364/474.2 X |
| 4,862,373 | 8/1989 | Meng | 364/461 X |
| 4,888,707 | 12/1989 | Shimada | 364/474.2 X |

OTHER PUBLICATIONS

Kondo et al., "Collision Avoidance Using Free Space Enumeration Method Based on Lee's Algorithm", Journal of the Robotics Society Japan, vol. 5, No. 4, pp. 11–20 (1987).
Lozano-Perez, "A Simple Motion-Planning Algorithm for General Robot Manipulators", vol. RA-3, No. 3, IEEE, Journal of Robotics and Automation, 6/87, pp. 224–238.
Hasegawa, "Collision Avoidance Using Characterized Description of Free Space", ICAR, 1985, pp. 69–76.
Kondo et al., "Collision Avoidance Using a Free Space Enumeration Method Based on Grid Expansion", Advanced Robotics, vol. 3, No. 0, pp. 1–17 (1988).

Primary Examiner—Joseph Ruggiero
Attorney, Agent, or Firm—Foley & Lardner

[57] ABSTRACT

A method and an apparatus for free space enumeration for motion planning, having general applicability while reducing amounts of information and calculations involved, capable of modifying a path, capable of setting up appropriate configuration space quantization, and capable of adopting appropriate strategy for free space enumeration. The method may include the step of selecting cells only between the initial point and the final point, or selecting cells between the initial point and the final point, using a plurality of strategies for selecting the cells simultaneously, or dividing the configuration space into multiplicity of cells defined in terms of intervals in the degrees of freedom, or determining a collision-free path in the free space joining the initial point and the final point without collision, or modifying the collision-free path.

80 Claims, 40 Drawing Sheets

FIRST JOINT   SECOND JOINT

FIG.21
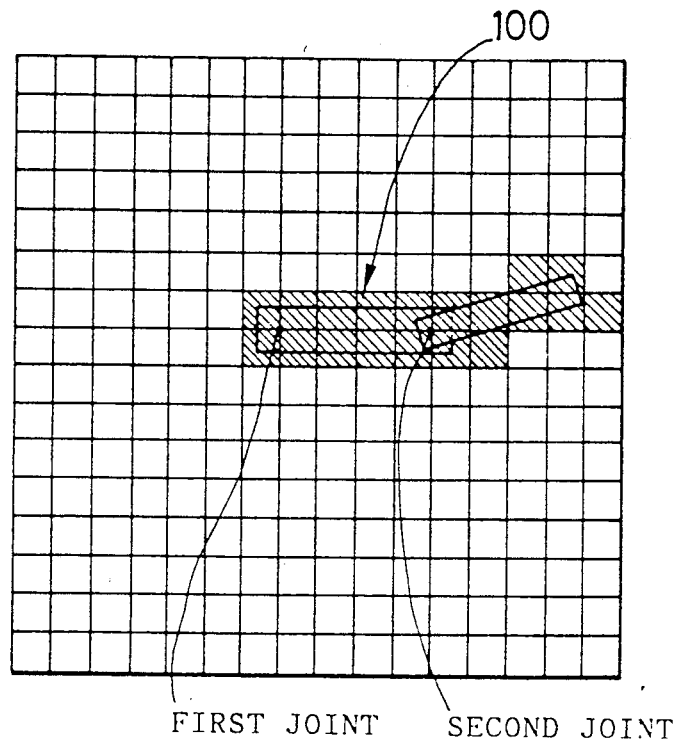
FIRST JOINT    SECOND JOINT
FIG.22(A)
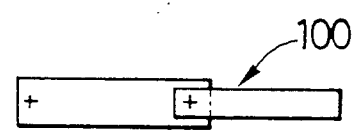
FIG.22(B)
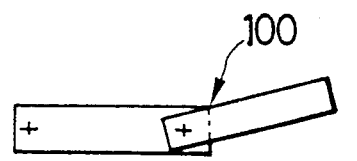
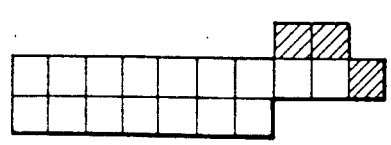
FIG.22(C)
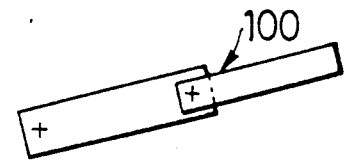
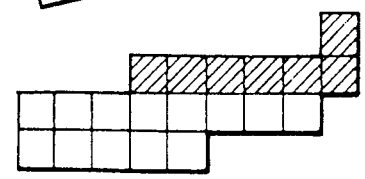

NO.OF COLLISION DETECTIONS

NO.OF COLLISION DETECTIONS

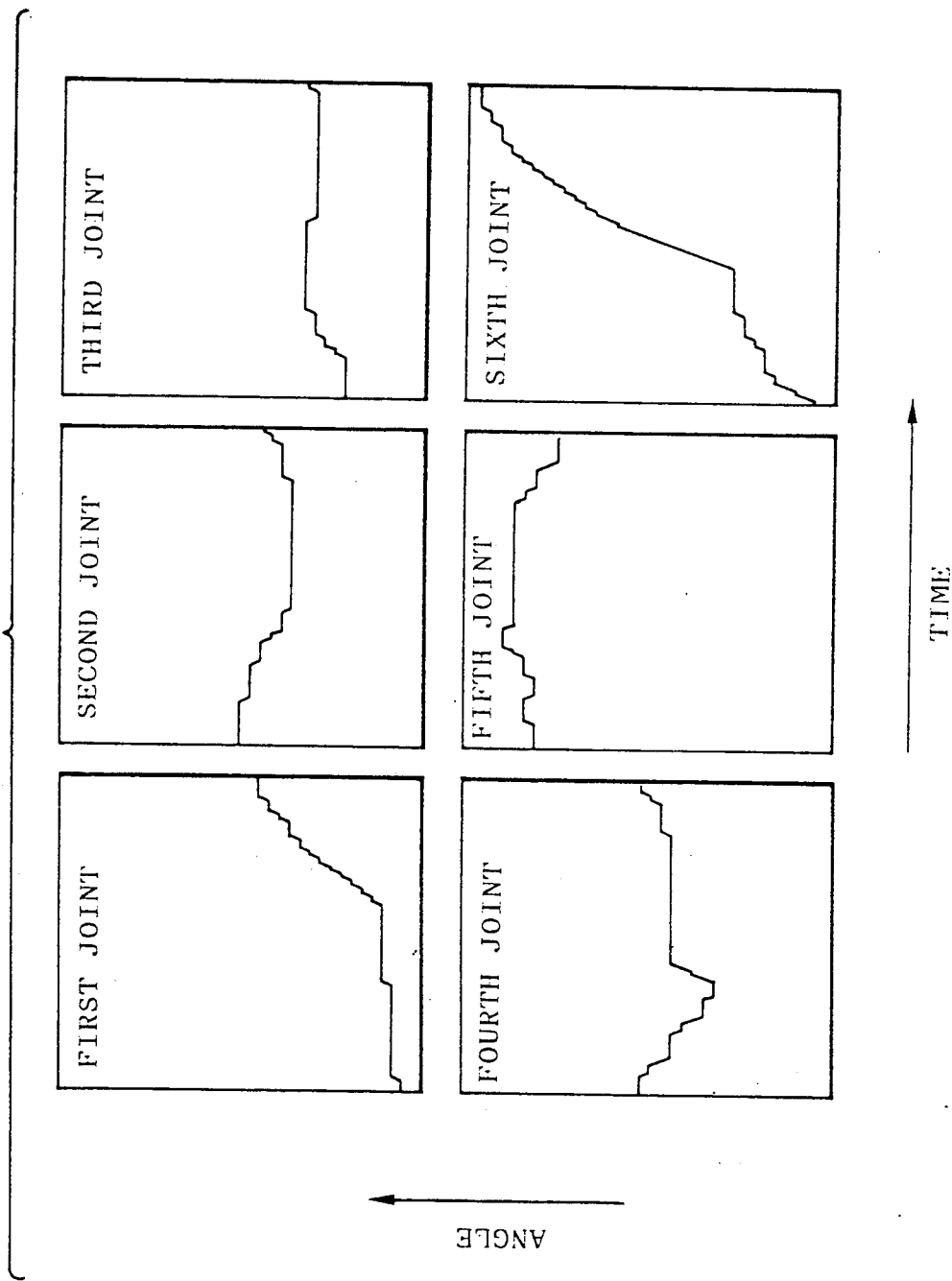

METHOD AND APPARATUS OF FREE SPACE ENUMERATION FOR COLLISION AVOIDANCE

BACKGROUND OF THE INVENTION

1. Field of the Invention

The present invention relates to a method and an apparatus of free space enumeration for collision avoidance, which have a primary application in the field of motion planning of robot manipulators, to be utilized in obtaining a collision-free path in which a moving object such as a manipulator can move without a collision with surrounding objects. The method and the apparatus can also be utilized beneficially as a space enumerator in designing an optimal arrangement of various apparatuses, including piping in factories, and electronic circuitry.

2. Description of the Background Art

For motion planning of a moving object such as a manipulator, between given initial position and configuration, and given final position and configuration, where a path capable of avoiding collisions with surrounding obstacles is sought, use of a so called configuration space of N-dimension parametrically defined in terms of N-degrees of freedom for the manipulator's position and configuration has been considered effective.

In this type of motion planning, there is a one-to-one correspondence between a point of the configuration space and a unique position and configuration of the manipulator, so that the path of the manipulator capable of avoiding collisions with surrounding obstacles, which can easily be highly complicated in 3-dimensional physical space, can be represented by a simple trajectory of the point of the configuration space through a collision free region of the configuration space called a free space.

An example of such a configuration for a manipulator and obstacles shown in FIG. 1(A) is shown in FIG. 1(B), where a vertical axis represents angles of a third joint of the manipulator, and a horizontal axis represents angle of second joint of the manipulator. The 3-dimensional physical configuration shown in FIG. 1(A) is represented by the configuration space shown in FIG. 1(B) in which those values of the second and the third joint angles that cause collisions between the manipulator and the obstacles are shown as a block of black cells (named as a collision cells in the figure), with the remaining free space surrounding it. Thus, for the manipulator to move from an initial configuration represented by a cell A to a final configuration represented by another cell B without colliding with obstacles, a path must be chosen around the collision cells.

Since the configuration space, in general, is divided up into a multiplicity of small regions called cells, it is necessary to determine which cells belong to the free space. Although, in principle, this can easily be accomplished by performing collision detections between the manipulator and the obstacles, a progressive increase in amounts of information to be dealt with accompanying an increase in dimensionality, limits the extent to which collision detections can be carried out.

For instance, a manipulator with 6 degrees of freedom calls for a 6-dimensional configuration space, and when each of the 6 coordinates is to be divided up (or quantized) into 32 equal parts in order to define cells, the number of cells becomes a sixth power of 32, which makes a practical implementation of complete collision detections for all the cells almost impossible.

Thus, in practice a reduction of an amount of information is indispensable.

One known way of achieving this is by considering only those degrees of freedom having major contribution to the motion in accordance with the functional characteristics of the manipulator, and thereby reducing the dimensionality of the configuration space. For example, when the motion of a manipulator with six degrees of freedom can largely be determined by three of those six degrees of freedom related to the main arm alone, the motion of this manipulator may effectively be described by the 3-dimensional configuration space using only three degrees of freedom related to the main arm. However, this way of reducing the amount of information requires a knowledge of those degrees of freedom having major contributions to the motion, which have to be decided case by case, so that not only the preparation for such motion planning becomes cumbersome, but also the general applicability of this type of motion planning is severely restricted.

Another known way of achieving the reduction of the amount of information is, as discussed by the present applicant in "collision avoidance using free space enumeration method based on Lee's algorithm" in *Journal of Robotics Society of Japan*, Vol. 5, no. 4, pp. 11-20, 1987, to limit the free space to just a region relevant in obtaining the path. However, in such conventional motion planning, in order to achieve reduction of the amount of information, the path has been determined irrespective of ease in motion, so that dangerous paths such as those which are nearly grazing the obstacle have often been resulted. Furthermore, this manner of reducing the amount of information is based on a method called wavefront expansion, which will be explained in detail below, so that it will be seen that the reduction cannot be sufficient for those cases involving six degrees of freedom.

Likewise, in the application of the free space enumerator to design an optimal arrangement of various apparatuses, piping in factory, or electronic circuitry, for example, practically dangerous spaces such as those in the immediate vicinity of obstacles have often been obtained.

As explained, in conventional methods for motion planning, an enormous amount of information required in performing a complete collision detections cannot be suppressed without sacrificing either the general applicability of the methods or the practicality of the path or the space to be obtained.

Furthermore, there is another problem in the conventional methods for motion planning, concerning the manner of quantizing the coordinates of the configuration space. Namely, when the coordinates of the configuration space are quantized by the same interval throughout, as in the conventional methods, due to the differences in significance with respect to the whole motion possessed by different degree of freedom, the quantization may be unnecessarily fine for some such as a main arm portion and too coarse to obtain a sufficient accuracy for the other such as a finger portion. The unnecessarily fine quantization causes a drastic increase in the amount of information to be dealt with, which, in turn, causes a tremendous elongation of operation time. On the other hand, the insufficient accuracy due to the coarse quantization may cause the overlooking of a small obstacle, such as a thin wire.

In addition, conventional methods for motion planning are associated with yet another problem in determination of the free space cells. Since there are many different types of manipulators, with different degrees of freedom, and also since changes in environmental conditions of the manipulator delicately affect the state of the configuration space, the method of determining the free space must cells in the configuration space be chosen carefully, in order for the method to be effective.

However, it is extremely difficult to select an appropriate method for determining the free space cells, as the state of the configuration space is generally not known. Also, it is impossible to deal with all the information on the configuration space. The choice of an inappropriate method for determining the free space cells results in very inefficient operation and all the inconveniences caused by such operation.

SUMMARY OF THE INVENTION

It is therefore an object of the present invention to provide a method and an apparatus of free space enumeration for motion planning, having general applicability to various types of moving objects, and at a same time capable of reducing amounts of information and calculations involved in obtaining motion for objects with multiple degrees of freedom.

Another object of the present invention is to provide a method and an apparatus of free space enumeration for motion planning, capable of modifying a path and a space obtained in a simplified manner to more practical ones.

Another object of the present invention is to provide a method and an apparatus of free space enumeration for motion planning, capable, of automatically setting up appropriate configuration space quantizations for different parameters of the configuration space.

Another object of the present invention is to provide a method and an apparatus of free space enumeration for motion planning, capable of adopting appropriate strategy for free space enumeration in accordance with a type of a moving object and environmental conditions of the moving object.

According to one aspect of the present invention there is provided an apparatus for enumerating a free space in a configuration space representing configurations of an object and surrounding obstacles in terms of degrees of freedom of the object, the configuration space being divided up into multiplicity of cells defined in terms of intervals in the degrees of freedom, the free space being continuously connecting a given initial point in the configuration space from which a motion of the object starts and a given final point in the configuration space at which the motion ends, the apparatus comprising: means for selecting cells only between the initial point and the final point; means for detecting a collision between the object and the surrounding obstacles in the selected cells; and means for memorizing positions in the configuration space of free space cells which are the selected cells for which the collision cannot be detected.

According to another aspect of the present invention there is provided an apparatus for enumerating a free space in a configuration space representing configurations of an object and surrounding obstacles in terms of degrees of freedom of the object, the configuration space being divided up into multiplicity of cells defined in terms of intervals in the degrees of freedom, the free space continuously connecting a given initial point in the configuration space from which a motion of the object starts and a given final point in the configuration space at which the motion ends, the apparatus comprising: means for selecting cells between the initial point and the final point, using plurality of strategies for selecting the cells simultaneously; and means for detecting a collision between the object and the surrounding obstacles in the selected cells.

According to another aspect of the present invention there is provided an apparatus for enumerating a free space in a configuration space representing configurations of an object and surrounding obstacles in terms of degrees of freedom of the object, the free space continuously connecting a given initial point in the configuration space from which a motion of the object starts and a given final point in the configuration space at which the motion ends, the apparatus comprising: means for dividing the configuration space into multiplicity of cells defined in terms of intervals in the degrees of freedom, including: means for partitioning a physical space into a multiplicity of sub-regions; means for calculating the change in a total volume of the sub-regions which contains at least a portion of the object when each one of the degrees of freedom is varied separately by one provisional unit of interval; and means for determining the intervals for the degrees of freedom defining the cells in the configuration space in accordance with the calculated change; means for selecting cells between the initial point and the final point; and means for detecting a collision between the object and the surrounding obstacles in the selected cells.

According to another aspect of the present invention there is provided an apparatus for motion planning using free space enumeration, in which configurations of an object and surrounding obstacles are represented by a configuration space defined in terms of degrees of freedom of the object, the configuration space being divided into multiplicity of cells defined in terms of intervals in degrees of freedom, in which the motion of the object between a given initial point in the configuration space from which the motion starts and a given final point in the configuration space at which the motion ends is planned, the apparatus comprising: means for enumerating a continuous free space between the initial point and the final point, in which the motion is possible, including: means for selecting cells only between the initial point and the final point; means for detecting a collision between the object and the surrounding obstacles in the selected cells; and means for memorizing positions in the configuration space of free space cells which are the selected cells for which the collision cannot be detected; and means for determining a collision-free path in the free space joining the initial point and the final point without the collision.

According to another aspect of the present invention there is provided an apparatus for motion planning using free space enumeration, in which configurations of an object and surrounding obstacles are represented by a configuration space defined in terms of degrees of freedom of the object, the configuration space being divided up into multiplicity of cells defined in terms of intervals in the degrees of freedom, in which a motion of the object between a given initial point in the configuration space from which the motion starts and a given final point in the configuration space at which the motion ends is to be planned, the apparatus comprising: means for enumerating a continuous free space between the initial point and the final point, in which the motion is possible; means for determining a collision-free path in the free space joining the initial point and the final point without any collision; and means for modifying the collision-free path.

According to another aspect of the present invention there is provided a method for enumerating a free space in a configuration space representing configurations of an object and surrounding obstacles in terms of degrees of freedom of the object, the configuration space being divided into multiplicity of cells defined in terms of intervals in degrees of freedom, the free space continuously connecting a given initial point in the configuration space from which a motion of the object starts and a given final point in the configuration space at which the motion ends, the method comprising the steps of: selecting cells only between the initial point and the final point; detecting a collision between the object and the surrounding obstacles in the selected cells; and memorizing positions space of free space cells in the configuration space which are the selected cells for which a collision cannot be detected.

According to another aspect of the present invention there is provided a method for enumerating a free space in a configuration space representing configurations of an object and surrounding obstacles in terms of degrees of freedom of the object, the configuration space being divided up into multiplicity of cells defined in terms of intervals in the degrees of freedom, the free space being continuously connecting a given initial point in the configuration space from which a motion of the object starts and a given final point in the configuration space at which the motion ends, the method comprising the steps of: selecting cells between the initial point and the final point, using plurality of strategies for selecting the cells simultaneously; and detecting a collision between the object and the surrounding obstacles in the selected cells.

According to another aspect of the present invention there is provided a method for enumerating a free space in a configuration space representing configurations of an object and surrounding obstacles in terms of degrees of freedom of the object, the free space being continuously connecting a given initial point in the configuration space from which a motion of the object starts and a given final point in the configuration space at which the motion ends, the method comprising the steps of: dividing the configuration space into multiplicity of cells defined in terms of intervals in the degrees of freedom, including the steps of: partitioning a physical space into multiplicity of sub-regions; calculating a change in a total volume of the sub-regions which contains at least a portion of the object when each one of the degrees of freedom is varied separately by one provisional unit of intervals; and determining the intervals for the degrees of freedom defining the cells in the configuration space in accordance with the calculated change; selecting cells between the initial point and the final point; and detecting a collision between the object and the surrounding obstacles in the selected cells.

According to another aspect of the present invention there is provided a method for motion planning using free space enumeration, in which configurations of an object and surrounding obstacles are represented by a configuration space defined in terms of degrees of freedom of the object, the configuration space being divided up into multiplicity of cells defined in terms of intervals in the degrees of freedom, in which a motion of the object between a given initial point in the configuration space from which the motion starts and a given final point in the configuration space at which the motion ends is to be planned, the method comprising the steps of: enumerating a continuous free space between the initial point and the final point, in which the motion is possible, including the steps of: selecting cells only between the initial point and the final point; detecting a collision between the object and the surrounding obstacles in the selected cells; and memorizing positions in the configuration space of free space cells which are the selected cells for which collision is not detected; and determining a collision-free path in the free space joining the initial point and the final point without collision.

According to another aspect of the present invention, there is provided a method for motion planning using free space enumeration, in which configurations of an object and surrounding obstacles are represented by a configuration space defined in terms of degrees of freedom of the object, the configuration space being divided into a multiplicity of cells defined in terms of intervals in the degrees of freedom, in which a motion of the object between a given initial point in the configuration space from which the motion starts and a given final point in the configuration space at which the motion ends is to be planned, the method comprising the steps of: enumerating a continuous free space between the initial point and the final point, in which the motion is possible; determining a collision-free path in the free space joining the initial point and the final point without the collision; and modifying the collision-free path.

Other features and advantages of the present invention will become apparent from the following description taken in conjunction with the accompanying drawings.

BRIEF DESCRIPTION OF THE DRAWINGS

FIG. 21 is an illustration of the manipulator in the physical space and its decomposition, for explaining the operation of space partition by the apparatus of FIG. 2.

FIG. 22(A), 22(B) and 22(C) are illustrations of the manipulator in the physical space and its decomposition at different configuration, for explaining the operation of space partition by the apparatus of FIG. 2.

FIG. 31(A) and 37(B) are illustrations of an initial and final configuration of the manipulator in the motion planned by the apparatus of FIG. 2.

FIG. 47 is a graph showing the collision-free path found for the configuration of FIG. 38 by the apparatus of FIG. 2.

DETAILED DESCRIPTION OF THE PREFERRED EMBODIMENTS

Figure 1A:
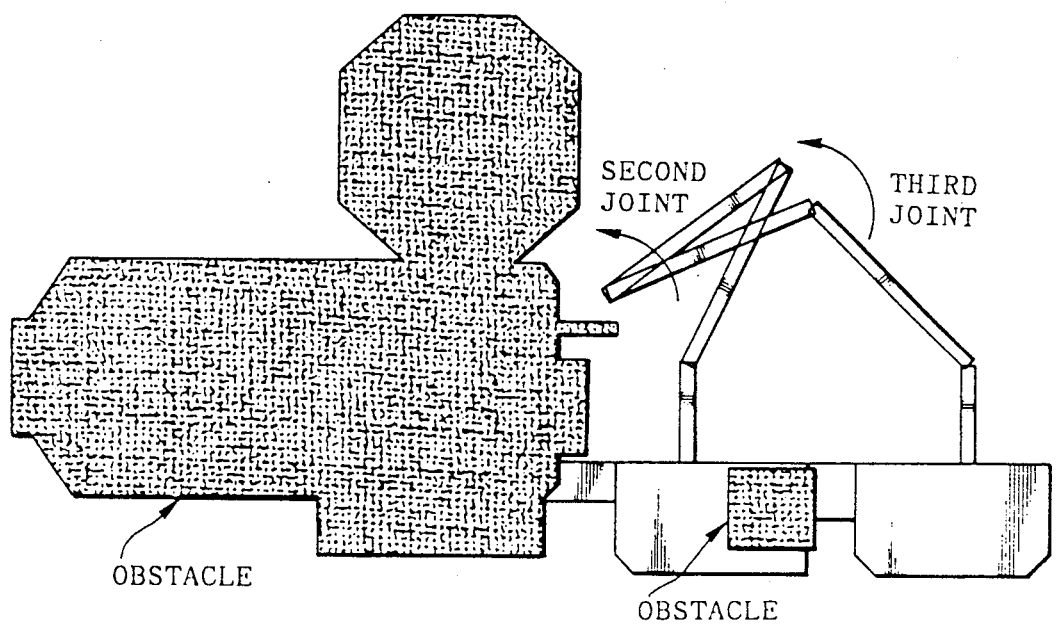
FIG. 1(A) and (B) are illustrations of a manipulator with surrounding obstacles and a corresponding configuration space, respectively, for explaining the relationship between the physical configuration and the corresponding configuration space.
Figure 1B:
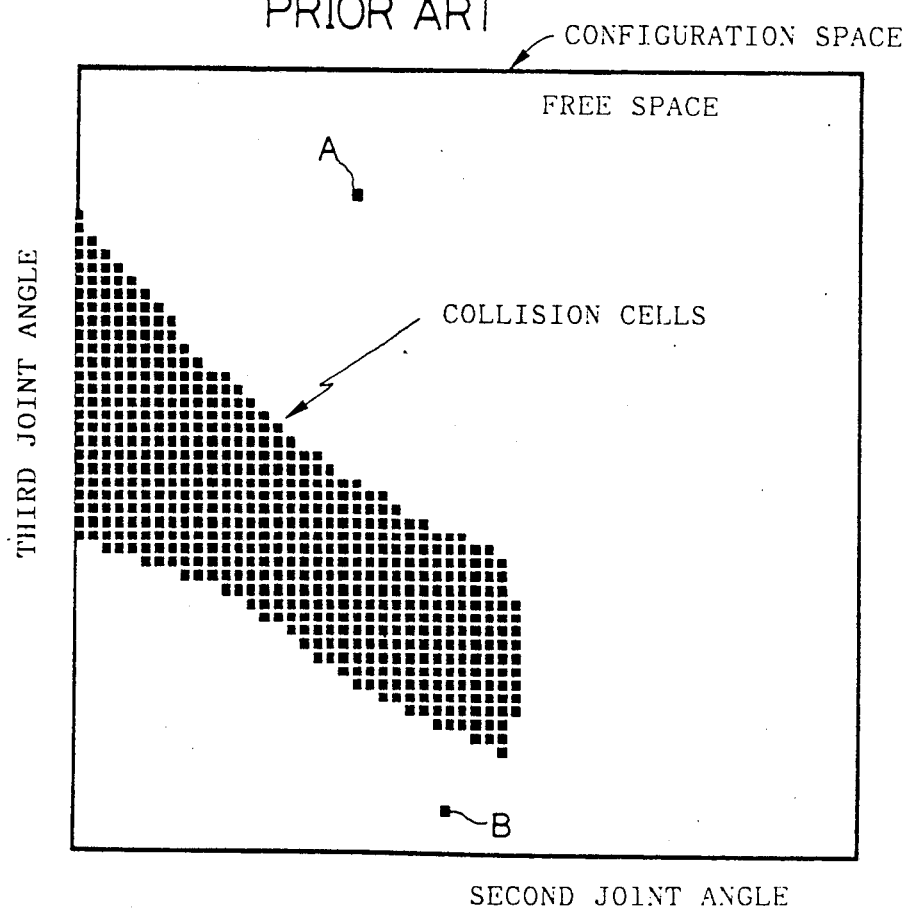
Figure 2:
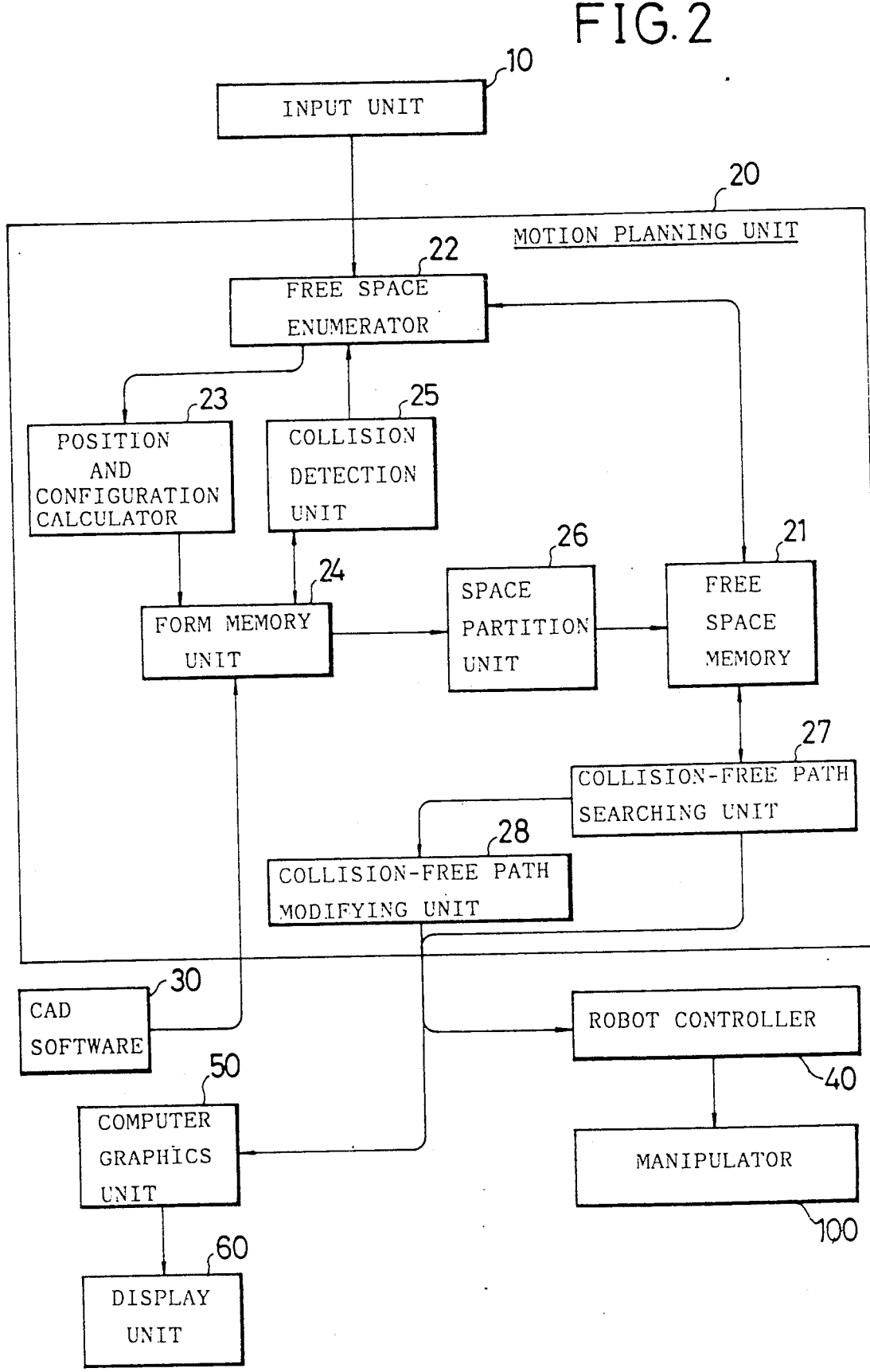
FIG. 2 is a schematic block diagram of one embodiment of an apparatus for motion planning using free space enumeration according to the present invention.

Referring now to FIG. 2, there is shown one embodiment of an apparatus for motion planning using free space enumeration according to the present invention.

This apparatus comprises an input unit 10 for introducing initial position and information as well as final position and information of a manipulator 100, a motion planning unit 20 for planning a motion for the manipulator 100, a CAD software 30 for assisting the motion planning unit 20, a robot controller 40 for controlling movements of the manipulator 100 in accordance with the motion planned by the motion planning unit 20, a computer graphics unit 50 for preparing computer graphic images of the motion planned by the motion planning unit 20, and a display unit 60 for displaying the computer graphic images prepared by the computer graphics unit 50.

The motion planning unit 20 further comprises a free space memory 21 for storing and administering configuration space defined in terms of degrees of freedom of the manipulator 100 as parameters, a free space enumerator 22 for enumerating a continuous free space containing the initial position and configuration as well as the final position and configuration in the configuration space, a position and configuration calculator 23 for calculating the actual position and configuration of the manipulator 100 in the 2- or 3-dimensional physical space, a form memory unit 24 for memorizing an actual configuration of the manipulator 100 and surrounding obstacles in the physical space at the position and configuration calculated by the position and configuration calculator 23 in accordance with information provided externally from the CAD software 30, a collision detection unit 25 for detecting collisions between the manipulator 100 and the surrounding obstacles in the actual configuration memorized by the form memory unit 24, a space partition unit 26 for determining appropriate quantization of the configuration space in terms of cells, a collision-free path searching unit 27 for deriving a path in the configuration space for the manipulator 100 to move from the initial position and configuration to the final position and configuration without a collision, and a collision-free path modifying unit 28 for modifying the collision-free path derived by the collision-free path searching unit 27 to be more practical one.

The operation of the free space memory 21, the free space enumerator 22, the collision detection unit 25, and the collision-free path searching unit 27 will be explained, using for an example the configuration space shown in FIG. 3, along the flow chart of FIG. 4. Further detail of the other elements of this embodiment will be explained later.

Figure 3:
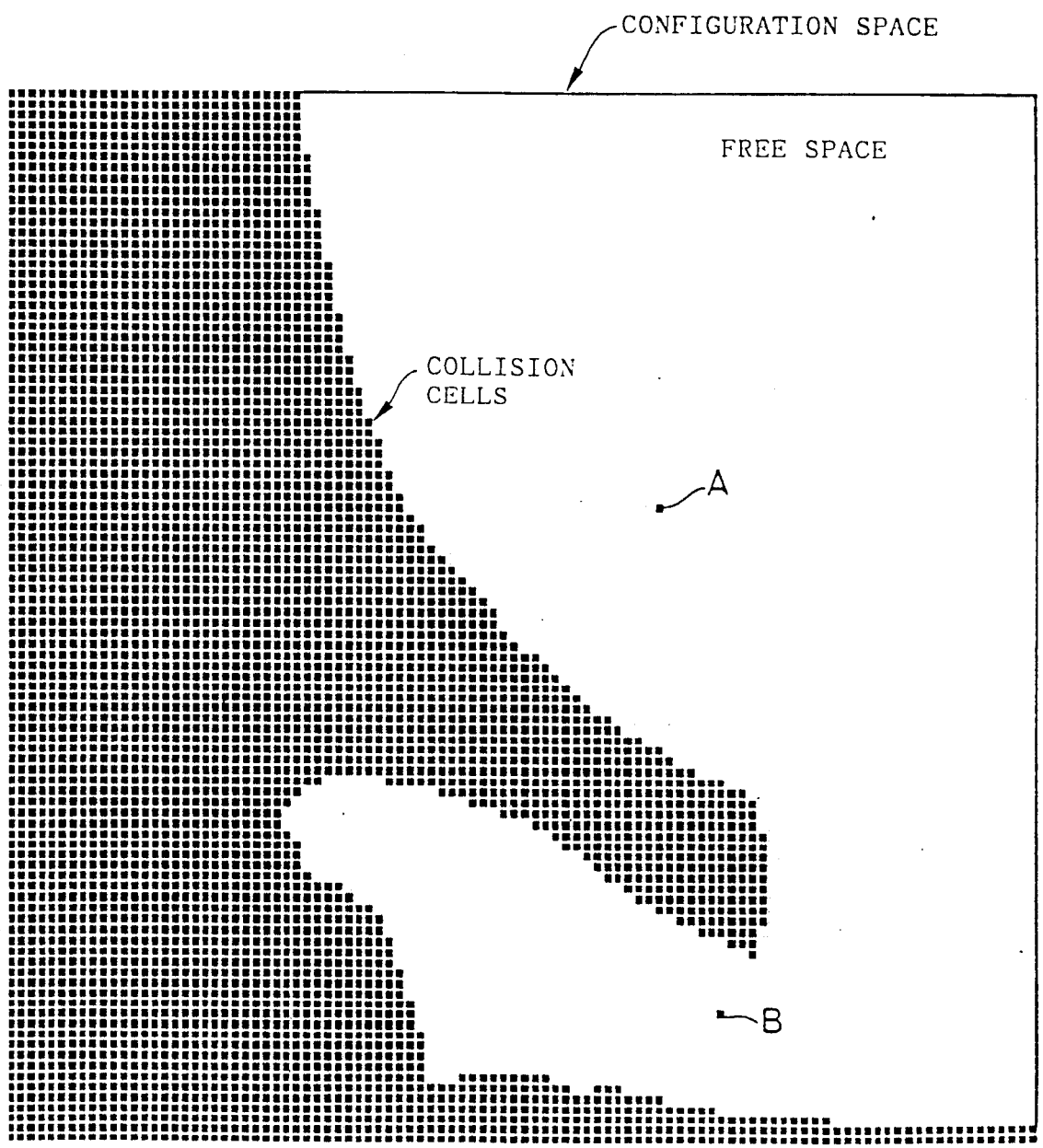
FIG. 3 is an illustration of an example of the configuration space to be utilized by the apparatus of FIG. 2.
Figure 4:
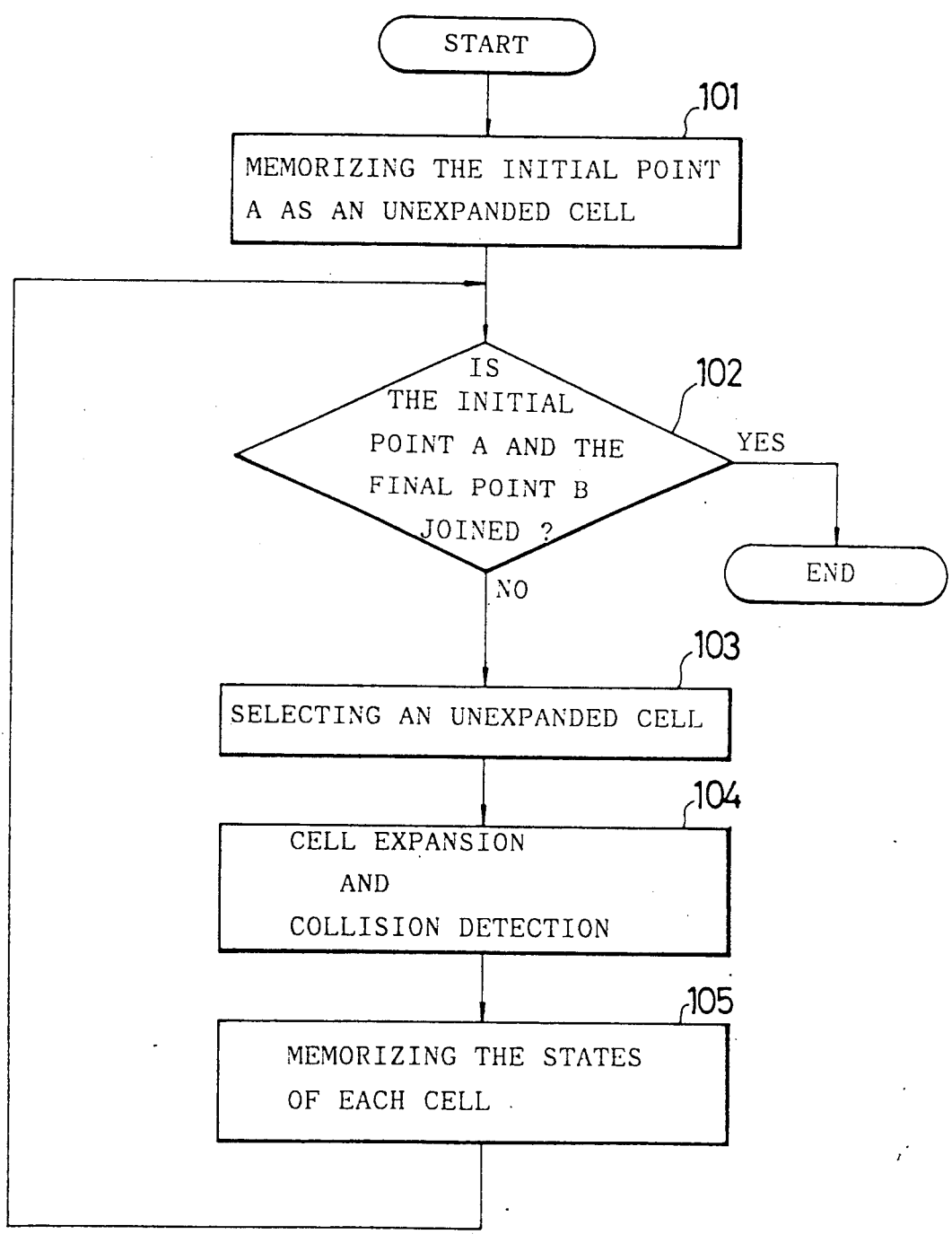
FIG. 4 is a flow chart for operation of free space enumeration by the apparatus of FIG. 2.

FIG. 3 shows the 2-dimensional configuration space for the manipulator 100 with two joints whose joint angles are represented by the vertical and horizontal axes where each joint angle is divided up into one hundred equal parts, the partition defined by these divisions defining the cells. The black cells are those positions and configurations in which the manipulator 100 collides with the surrounding obstacles, whereas the white cells are those belonging to the free space (referred hereafter as free space cells). The collision-free path on this configuration space for the motion of the manipulator 100 between the initial point A and the final point B is to be found. It is noted that, initially, when only the initial point A and the final point B are given, which cells are the free space cells, and which cells are not, is largely unknown.

The free space enumerator 22 utilizes the partition of the configuration space stored in the free space memory 21 as well as occurrence of collisions detected by the collision detection unit 25 in enumerating the free space.

In short, the cells joining the cell containing the initial point (referred hereafter as an initial cell) and the cell containing the final point (referred hereafter as a final cell) are searched under the assumption that those cells which are not known for certain to be a part of the free space are to be regarded as free space cells. This is done by selecting one adjacent free space cell of a free space cell, successively, starting from the initial cell. This operation is called a cell expansion. Here, the direction of searching is immaterial, and can be suitably chosen to be starting either from the initial point, the final point, or both (bi-directional).

What is outlined above is actually carried out as follows.

First, after the initial and final positions and configurations are entered at the input unit 10, the initial point A in the configuration space is memorized by the free space memory 21 as an unexpanded cell, at the step 101.

Then, at the step 102, whether the initial point A and the final point B is joined is determined by the free space enumerator 22.

When this is the case, the process terminates as the collision-free path between the initial point A and the final point B is obtained. Otherwise, at the step 103, one unexpanded cell is selected out by the collision-free path searching unit 27. This will be the initial cell at a first time.

Next, at the step 104, the cell expansion is carried out by the free space enumerator 22 with respect to the unexpanded cell selected at the step 103. For example, in the 2-dimensional configuration space of FIG. 3, four cells neighboring the initial cell are selected as candidates, and each of these four cells are checked by the collision detection unit 25 to see whether these cells are indeed free space cells.

The collision detection by the collision detection unit 25 can readily be accomplished by using a known algorithm which utilizes the fact that the convex polygonal figure can be described as a product set of half spaces. Namely, the collision detection for two convex polygonal figures is carried out by determining whether each vertex of one polygonal figure is located in the opposite side with respect to each face of the other polygonal figure.

The free space memory 21 memorizes the states of the cells as free space cells already expanded, unexpanded free space cells, cells already checked to cause a collision, and cells not yet checked at the step 105, and the process returns to the step 102.

From the second time on, the free space enumerator 22 picks out one adjacent free space cell from the candidate cells in accordance with a heuristic function at the step 103. An example of the heuristic function is a function f given by:

$$f = c + h \tag{1}$$

where c is a normalized distance given in terms of a number of cells from the initial cell, and h is a estimated distance to the final cell which can, for instance, be set equal to twice the length of the straight line to the final point B. A more sophisticated way to derive the estimated distance h is by the following equation:

$$h = G \times \sqrt{\Sigma a(i) \times [c(i) - Fc(i)]^2} \tag{2}$$

where G is an overall coefficient, a(i) is an i-th coefficient, c(i) is an i-th coordinate value of the candidate cell, Fc(i) is an i-th coordinate value of the final point B, of which the overall coefficient G and coefficients a(i) are to be prescribed. A different prescription gives different strategies for the collision-free path search. This point will be further explored below. This heuristic function is evaluated for each candidate cell, and the one minimizing the heuristic function will be selected as a next unexpanded cell.

When the free space enumeration is completed by joining the initial and final points continuously with free space cells, the collision-free path searching unit 27 searches a collision-free path within the enumerated free space cells.

Figure 5:
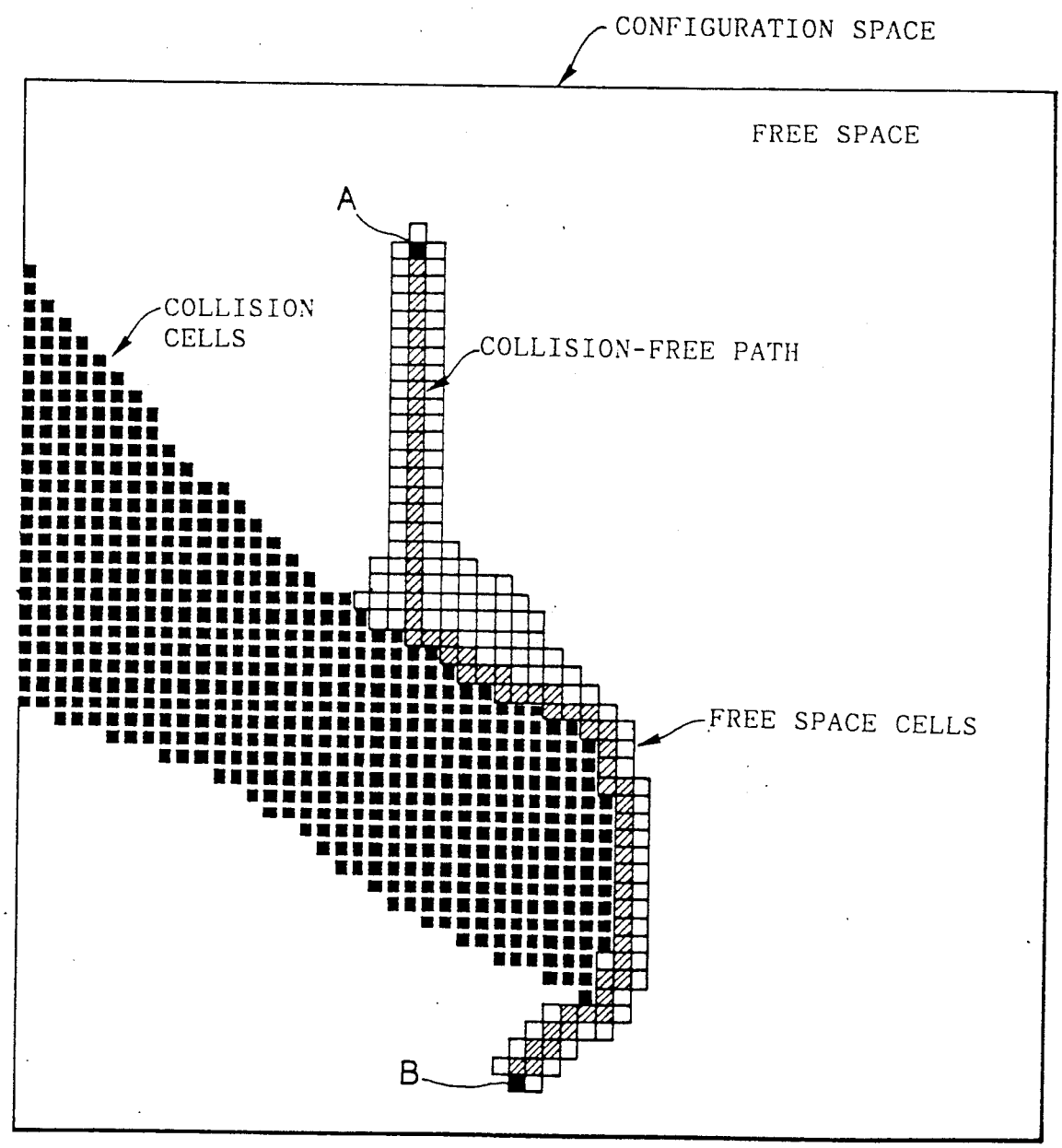
FIG. 5 is an illustration of the configuration space of FIG. 3, showing, in addition, the result of the free space enumeration and the collision-free path search by the apparatus of FIG. 2.
Figure 6:
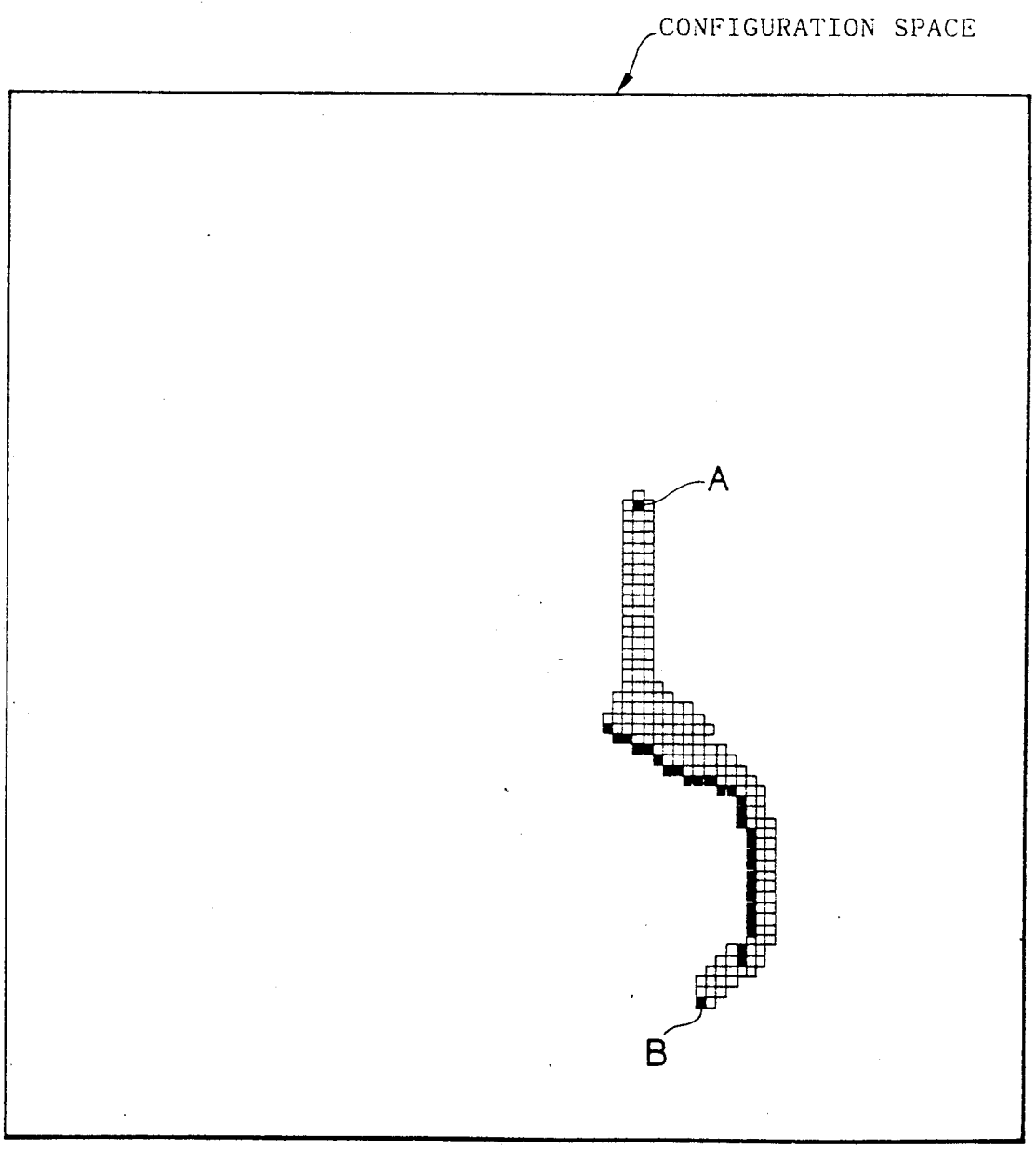
FIG. 6 is an illustration of the configuration space of FIG. 3, showing in particular the free space enumerated by the apparatus of FIG. 2.

The result of this operation is shown in FIG. 5, where a region around the expanded cells are excerpted, with the path given by those cells which are successively selected as a starting unexpanded cell in the cell expansions are indicated as shadowed cells. These expanded cells over the entire configuration space is also shown in FIG. 6. As can be seen from FIG. 6, only a part of the entire configuration space is relevant in searching the path.

Figure 7:
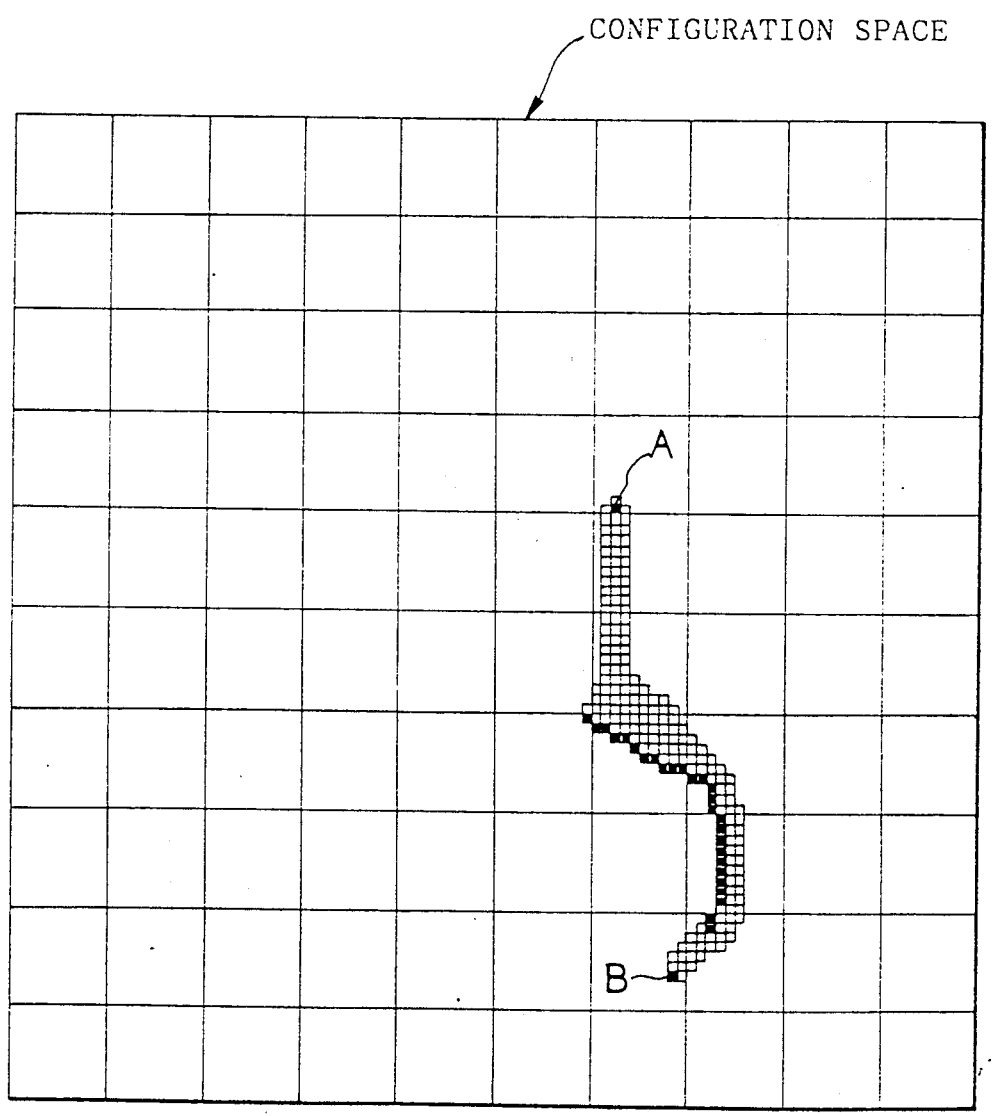
FIG. 7 is an illustration of the configuration space of FIG. 3, showing in particular the free space enumerated by the apparatus of FIG. 2 along with partitions of the configuration space.
Figures 8, 9:
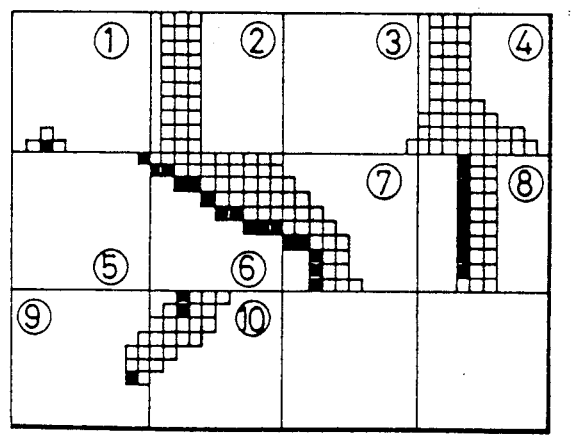
FIG. 8 is a diagrammatic illustration of blocks in the configuration space of FIG. 3, for explaining the manner of memorizing the free space by the apparatus of FIG. 2.
FIG. 9 is a diagrammatic illustration of a free space memory unit of the apparatus of FIG. 2, for explaining the manner of memorizing the free space by the apparatus of FIG. 2.

For this reason, in this embodiment, the entire configuration space is divided up into one hundred blocks, each block containing one hundred cells, as shown in FIG. 7, and only those blocks which contain expanded cells are allocated with the memory address in the free space memory 21, accompanied by the labelling number. In FIG. 8, those blocks having the memory space allocated are so indicated by being given the labelling numbers appearing as encircled numerals, whereas the others are given crosses to indicate that these others are not allocated with the memory address. Thus, in the free space memory 21, only those blocks with the labelling numbers given are stored, as shown in FIG. 9. Because of this, the memory space in the free space memory 21 in this embodiment can be kept small.

After the path has been obtained by the cell expansion, as shown in FIG. 5, the collision-free path is modified by the collision-free path modifying unit 28. The operation of this collision-free path modifying unit 28 will now be explained along the flow chart of FIG. 10.

The collision-free path modifying unit 28 utilizes a method called wavefront expansion, so called because of the analogy to the radially outgoing wave propagation caused by dropping a stone on the water. In short, in the wavefront expansion, the additional free space is enumerated from the given path by expanding the boundary of the free space in four directions of the neighboring cells in the case of 2-dimensional configuration space.

Figure 11:
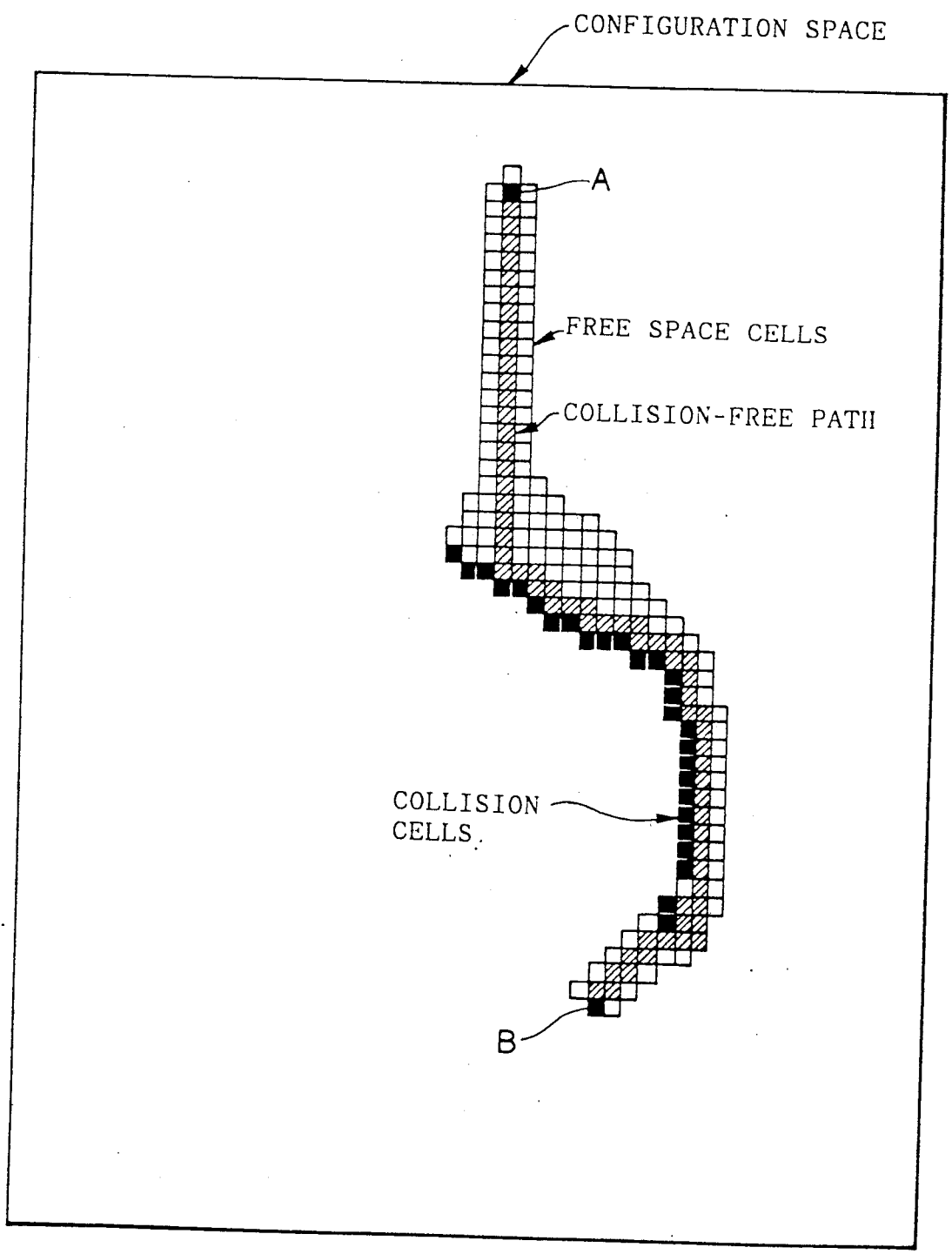
FIG. 11 is an illustration of the free space enumerated and the collision-free path found, for explaining the manner of collision-free path modification by the apparatus of FIG. 2.
Figure 12:
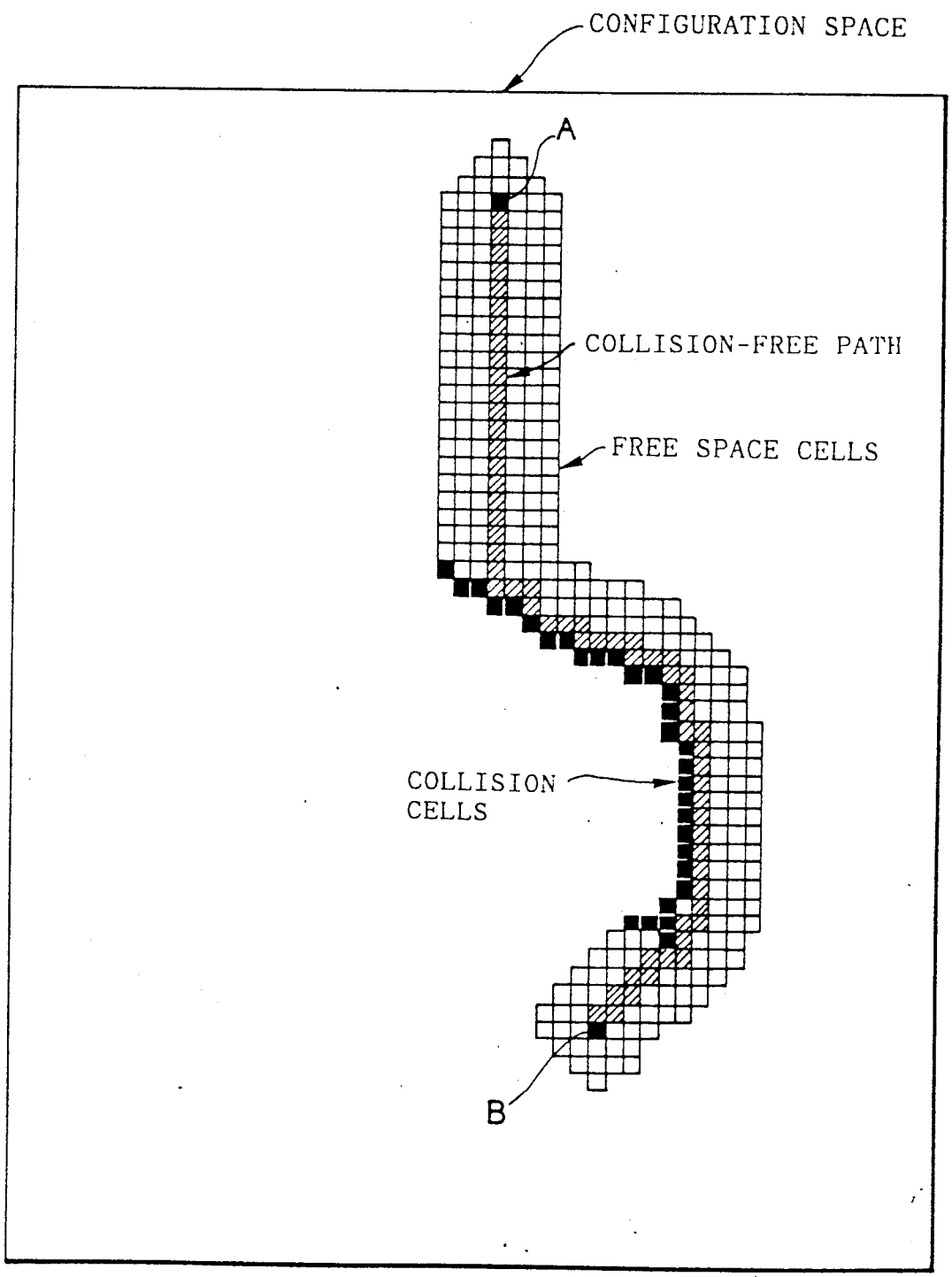
FIG. 12 is an illustration of the free space expanded and the collision-free path found, for explaining the manner of collision-free path modification by the apparatus of FIG. 2.

Thus, when the collision-free path obtained by the collision-free path searching unit 27, shown in FIG. 11, comes to the collision-free path modifying unit 28 at the step 201, the enumeration of the additional free space is carried out at the step 202 by performing the wavefront expansion with respect to the path in three-dimension, as shown in FIG. 12. Here, the expansion will not be continued in a direction in which the edge of the free space (wavefront) reaches the collision cells, as soon as this happens.

Figure 13:
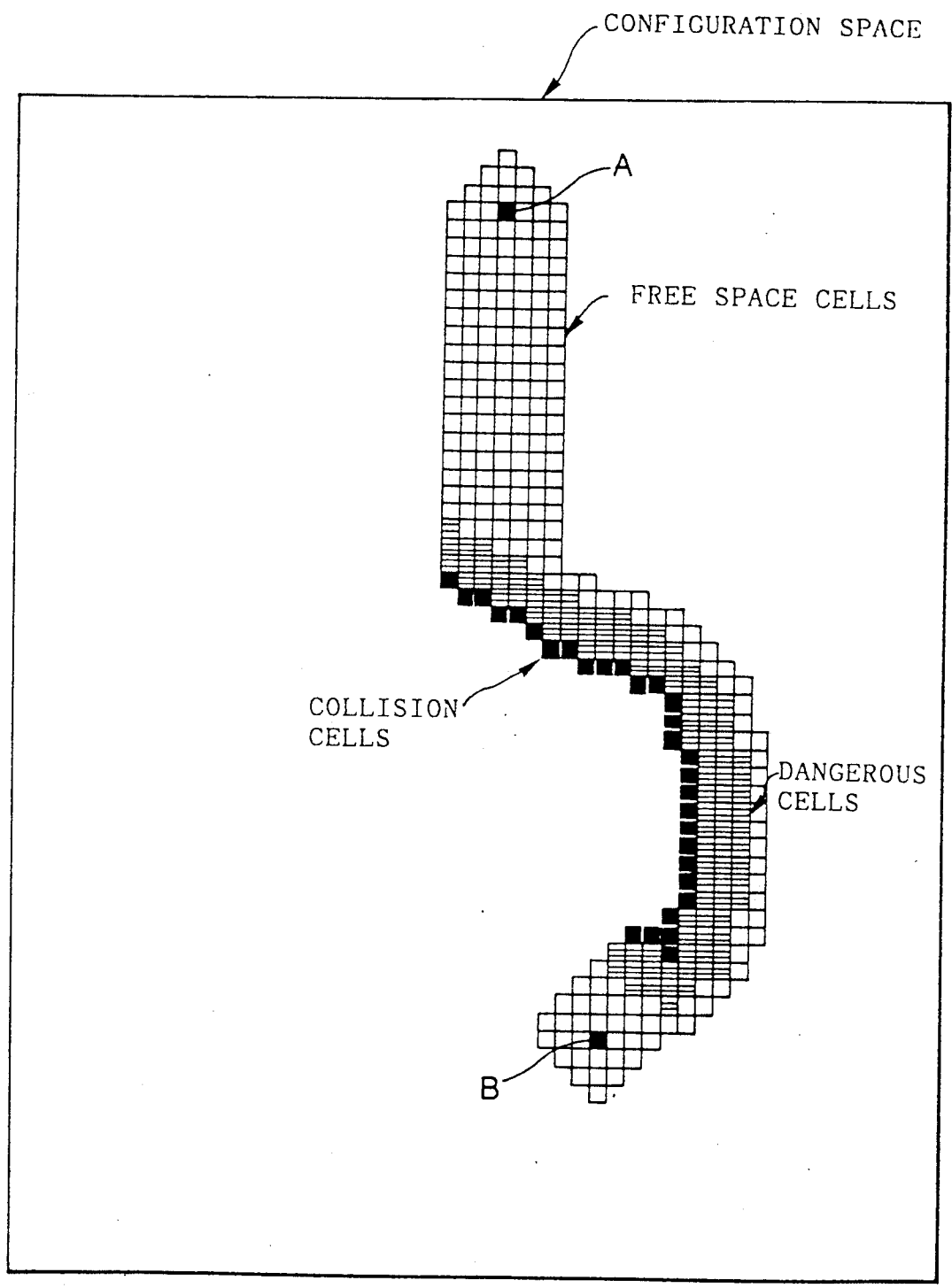
FIG. 13 is an illustration of the free space expanded and the collision-free path found, showing in particular dangerous cells, for explaining the manner of collision-free path modification by the apparatus of FIG. 2.

Next, at the step 203, the wavefront expansion is carried out, in three-fold again, with respect to the collision cells located nearby the collision-free path within the free space enumerated at the step 202, as shown in FIG. 13, in order to find out dangerous cells which are free space cells too closely located nearby the collision cells.

Figure 14:
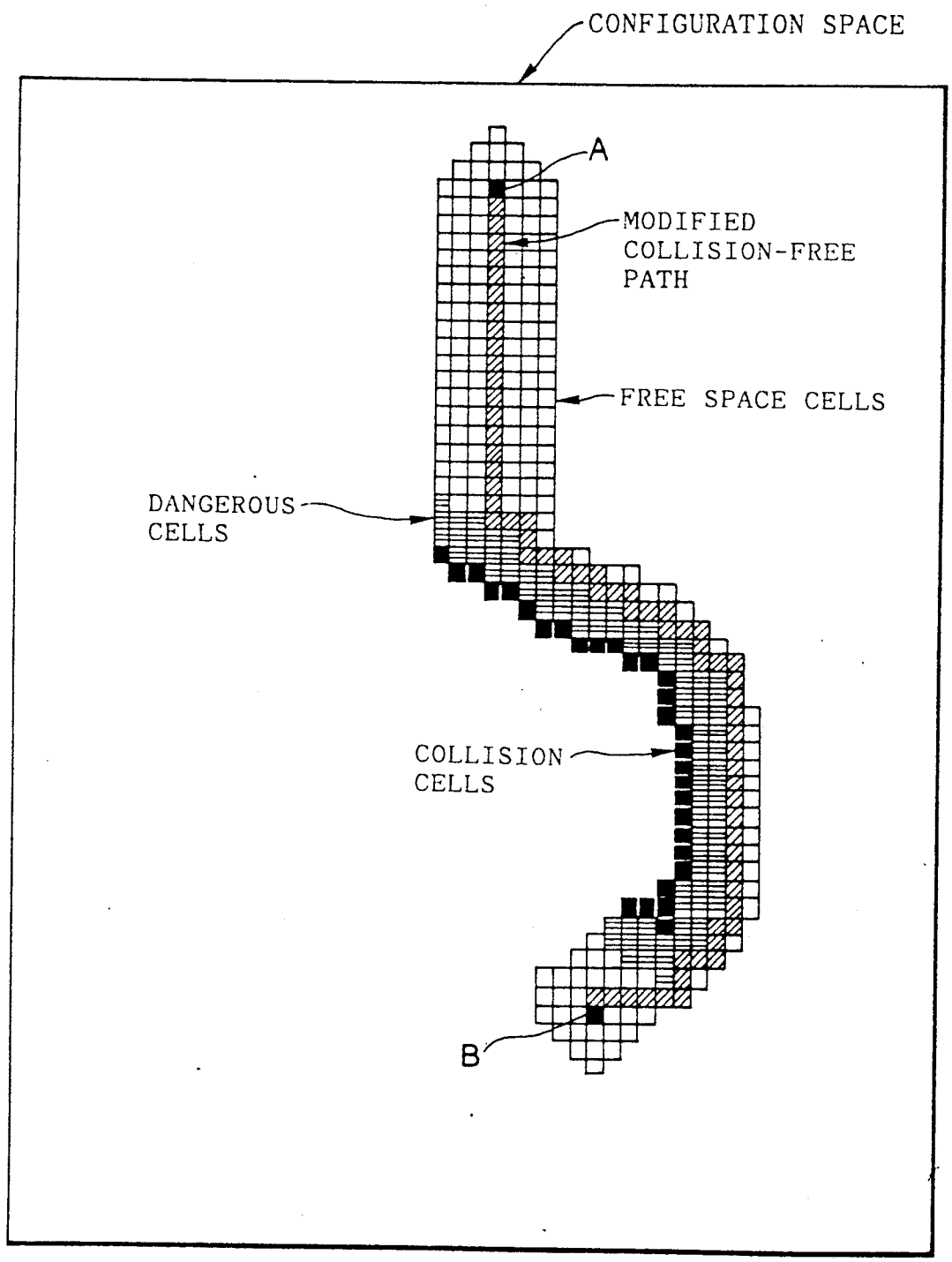
FIG. 14 is an illustration of the free space expanded and the modified collision-free path, for explaining the manner of collision-free path modification by the apparatus of FIG. 2.

Then, at the step 204, the collision-free path is searched within the free space excluding the dangerous cells found at the step 204, as shown in FIG. 14, to obtain the modified collision-free path at the step 205.

To be more specific, there are several possible ways to carry out wavefront expansion, of which two most representative ways will be explained now.

The first way is to utilize local neighborhood operations using a scanning window. This way is closely related to the local neighborhood operations for differentiation and smoothing in image processing.

Figure 15:
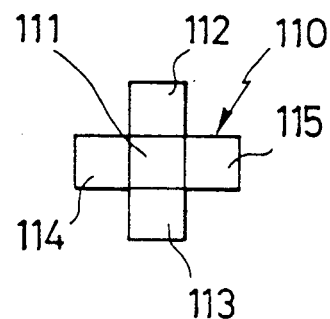
FIG. 15 is an illustration of a scanning window to be utilized for the expansion of free space by the apparatus of FIG. 2.

An example of the scanning window is shown in FIG. 15, where the scanning window 110 comprises a part for a central cell 111 surrounded by parts for its four neighbors 112 to 115 in four different directions.

Figure 16:
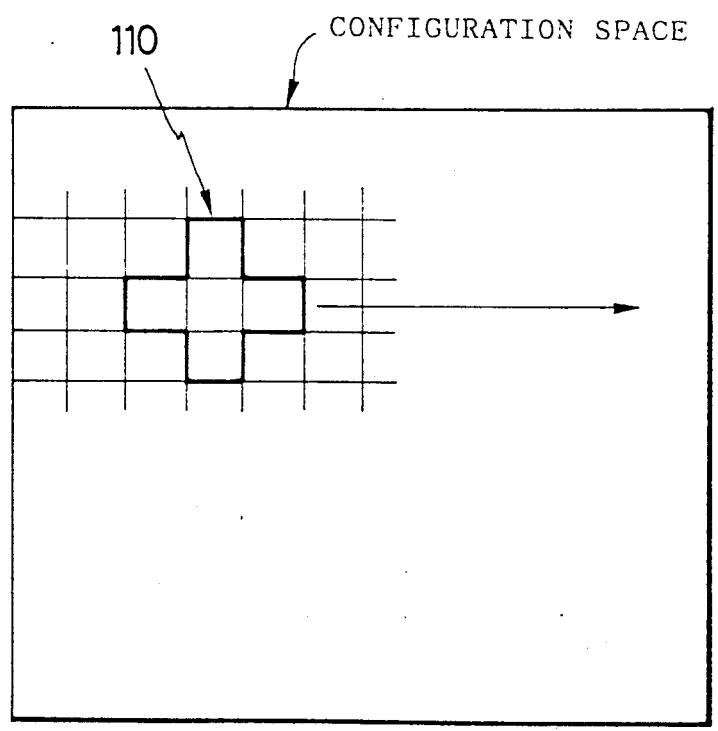
FIG. 16 is an illustration of the scanning window of FIG. 15 on the configuration space, for explaining the manner of utilizing the scanning window in the expansion of free space by the apparatus of FIG. 2.

This scanning window 110 scans the entire configuration space, as shown in FIG. 16. When the wavefront does not cover the central cell part 111, but does so for at least one of the surrounding parts 112 to 115, then the wavefront is expanded so as to cover the central cell part 111. When the wavefront does cover the central cell part 111, or when the wave front does not cover any part of the scanning window 110, no wavefront expansion takes place. To expand the wavefront by several cells, the scanning by the scanning window 110 can be repeated several times.

This type of wavefront expansion operation can be handled by an appropriately programmed software on an ordinary computer, but there is also a specially developed hardware for this purpose, disclosed in the Japanese Patent Laid Open NO. S63-30908 by the present applicant and others.

The second way is to utilize a evaluation value in determining the cells to be expanded. This second way resembles the method for the cell expansions explained above.

Figure 17:
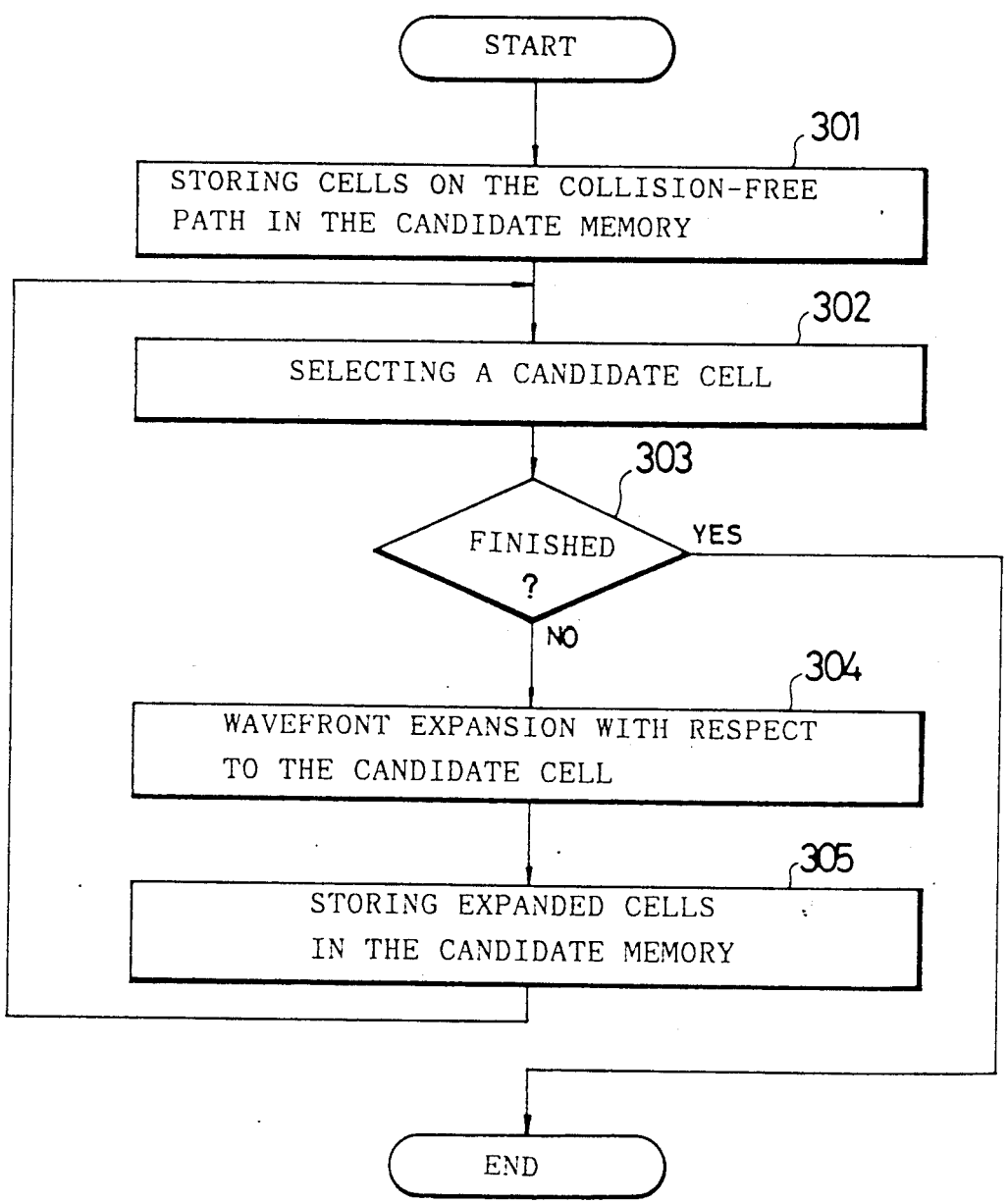
FIG. 17 is a flow chart for wavefront expansion to be performed by the apparatus of FIG. 2.

The flow chart for carrying out this wavefront expansion is shown in FIG. 17. This way requires a candidate memory device for memorizing candidate cells.

First, at the step 301, each cell on the collision-free path is stored in the candidate memory with an evaluation value of 0 attached. The evaluation value indicates the number of wavefront expansions performed in obtaining that cell, so that the evaluation value 0 indicates that this cell is obtained without performing any wavefront expansion.

Next, at step 302, the cell in the candidate memory which has the lowest evaluation value is selected the as a candidate cell with respect to which the wavefront expansion is to be performed. When there is more than one cell in the candidate memory with the same lowest evaluation value, the selection is made arbitrarily. This process of selecting the candidate cell may be facilitated by arranging the cells in the candidate memory in order of increasing evaluation value. Also, the selected candidate cell is deleted from the candidate memory at this point.

Next, at the step 303, whether or not the operation is finished is determined. When this is the case, the operation terminates as it should, and otherwise the step 304 will be taken.

At the step 304, the wavefront expansion is performed with respect to the selected candidate cell such that the wavefront will cover those neighboring cells of the candidate cell which has net been covered by the wavefront. The neighboring cells of the candidate cell are, for example in the 2-dimensional configuration space, those cells adjacent to the candidate cell in four directions of right, left, up, and down.

The neighboring cells which became to be covered by the wavefront as a result of this wavefront expansion at the step 304 are then stored in the candidate memory with the evaluation value of 1 attached, at the step 305.

The operation then returns to the step 302, and will be repeated until the wavefront expansion is finished. When all the cells on the collision-free path in the candidate memory has been selected as the candidate cell, the cells with the evaluation value 0 will be completely deleted from the candidate memory, so that the cells with the evaluation value 1 can be the candidate cells in the next cycle of the operation. Thus, when the wavefront expansion is to be performed in three dismension as above, the operation can be terminated as soon as the cell with the evaluation value 3 is selected as the candidate cell.

The operation just described may be further modified by memorizing those free space cells which are being covered by the wave front as such. Also, the evaluation values assigned to each free space cell can be useful in performing wavefront expansion from the collision cells as an indicators of danger. Such information can be useful in controlling the speed of the manipulator 100, such that it moves slowly in passing near obstacles.

It is to be noted that although in the above explanation the wavefront expansion is carried out in three dismension, which is appropriate for the 2-dimensional configuration space, when the configuration space of the higher dimensionality is to be dealt with, the three dismension wavefront expansion can be too time consuming, and that in such a case the reduction of the wavefront expansion from three-fold to two-fold has been found to be effective. To improve the result in such cases, the further wavefront expansion may be performed from the modified collision-free path. Such alternation of wavefront expansion and the collision-free path modification can be repeated as many times as necessary for the desired standard.

It is also to be noted that obtaining the less dangerous collision-free path can also be done by adjusting the normalised distance c in the heuristic function f utilized above in obtaining the collision-free path by the collision-free path searching unit 27, such that this normalised distance c also reflects the presented by the cells in the collision-free path. For instance, for cells adjacent to the collision cells, the value of c can be weighted by adding 9, for cells in next fold by 4, and cells in next next fold by 1. This will yield the same collision-free path as that obtained above by the collision-free path modifying unit 28, shown in FIG. 14.

In summary, this feature of the collision-free path modifying unit 28 enable this embodiment to obtain the collision-free path which is much more practical and less dangerous, with minimum sacrifice in efficiency of the motion of manipulator 100.

This feature of the collision-free path modifying unit 28 is also very advantageous in applications of this embodiment other than the motion planning for the manipulator 100.

For example, CAD (computer aided designing) is widely used in designing various types of factories, apparatus, and electric circuit with reduced time and work. Some CADs incorporate space enumeration systems to assist designing. An example of this can be found in a CAD for designing piping in a factory, in which appropriate types and arrangement of the piping in different areas of the factory are deduced from the condition of the pipes, available space and cost. Thus, this embodiment can be successfully applied to such a space enumeration system by using real space coordinates as degrees of freedom defining the configuration space.

Figure 10:
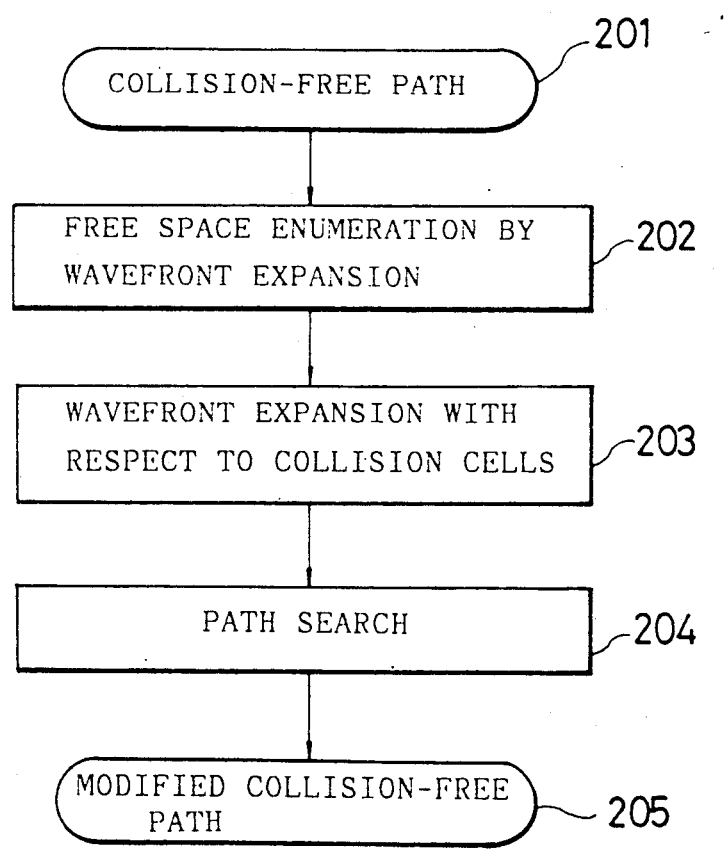
FIG. 10 is a flow chart for the operation of collision-free path modification by the apparatus of FIG. 2.
Figure 18:
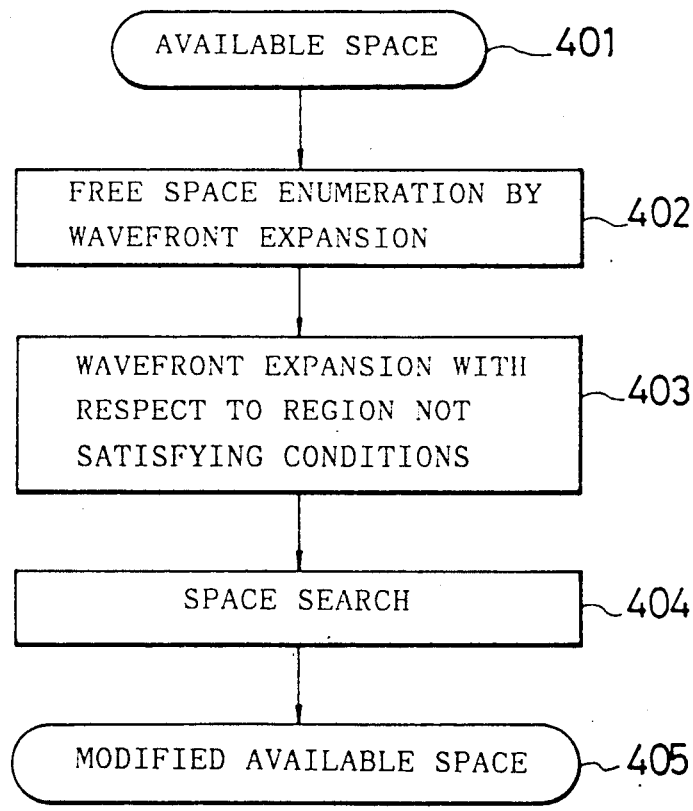
FIG. 18 is a flow chart for the operation of free space enumeration and collision-free path search by the apparatus shown in FIG. 2, in the application to the designing by CAD system.

The flow chart for this application bears a close resemblance to that for the motion planning shown in FIG. 10 above, can be devised which is shown in FIG. 18.

Thus, when the available space obtained in usual way comes to the collision-free path modifying unit 28 at the step 401, the enumeration of the additional free space is carried out at the step 402 by performing wavefront expansion with respect to this available space in three dimensions. Here, the expansion will not be continued in a direction in which the edge of the free space (wavefront) reaches the region not satisfying the conditions, as soon as this happens.

Next, at the step 403, the wavefront expansion is carried out, three-fold, again, with respect to the region not satisfying the conditions located nearby the available space within the free space enumerated at the step 402, in order to find out dangerous cells which are free space cells too closely located near the region not satisfying the conditions.

Then, at the step 404, the available space is searched within the free space excluding the dangerous cells found at the step 404 to obtain the modified available space at the step 405.

As a result, space enumeration for designing various types of factories, apparatus, and electric circuit with reduced time and work can be done in this embodiment with ample attentions paid for safety. Here, for instance, the wiring in an electric circuit can be arranged such that the effect due to the heat generated by the other wires can be minimized. Likewise, designing of various different objects can be done by this embodiment with attention paid to numerous different characteristics such as heat, magnetic field, vibration, noise, light etc.

Figure 19:
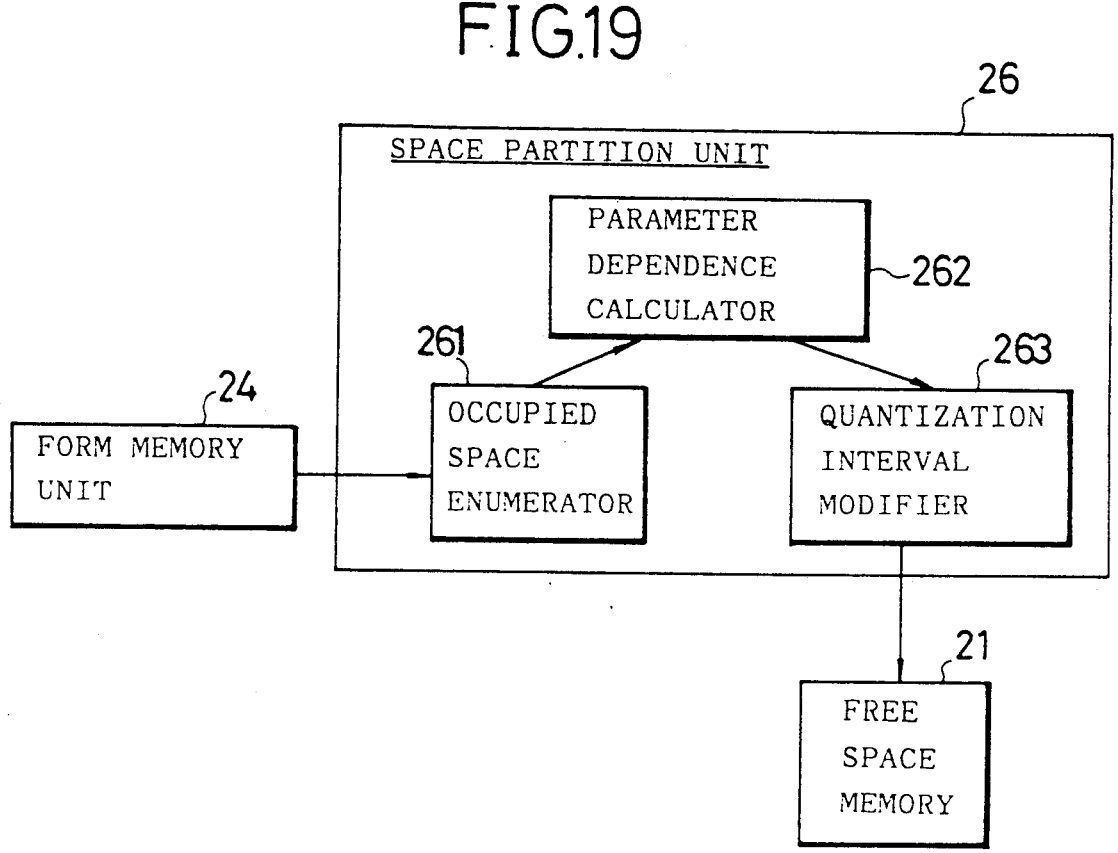
FIG. 19 is a detailed block diagram of a space partition unit of the apparatus of FIG. 2.

Referring now to FIG. 19, details of the space partition unit 26 of the motion planning unit 20 will be explained. As mentioned above, this space partition unit 26 determines appropriate partitions of the configuration space in terms of cells and arrangements of partitioning cells.

The space partition unit 26 further comprises an occupied space enumerator 261 for enumerating actual physical space occupied by the manipulator 100 in accordance with the actual configuration of the manipulator 100 and surrounding obstacles in the physical space at the position and configuration calculated by the position and configuration calculator 23 stored in the form memory unit 24, a parameter dependence calculator 262 for deriving parameter dependences of the occupied space as differences between the occupied space obtained with one parameter changed by one unit of a given configuration space quantization interval, and a quantization interval modifier 263 for adjusting the quantization interval of the configuration space in accordance with comparisons between the parameter dependences and the prescribed value.

To be more specific, there are several possible ways to carry out the operation of space partition, of which the two most representative ways will be explained.

The first way is to utilize a straightforward uniform partition by grid array of equal rectangles in 2-dimension, or of equal equilateral figures in general.

Figure 20A:
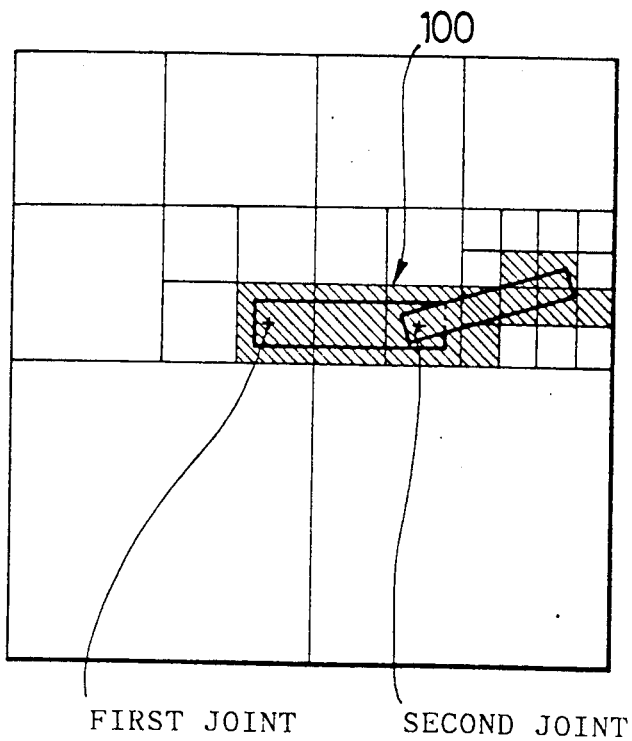
FIG. 20(A) and 20(B) are illustrations of the manipulator in the physical space and its decomposition, for explaining the operation of space partition by the apparatus of FIG. 2.
Figure 20B:
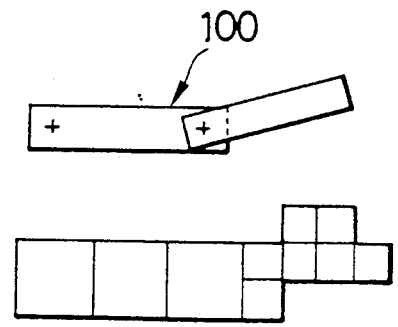

The second way is to utilize quad-tree or oct-tree. A quad-tree is a way of representing the 2-dimensional plane first by a large square, then dividing this square in four equal squares, and so on, as shown in FIG. 20(A), where those squares which contain at least a part of the manipulator 100 are shadowed. Here, dividing squares continues until sufficiently fine sub-divisions are obtained for the sake of ample approximation of the configuration of the manipulator 100 by the sub-divided squares. In this quad-tree, the particular configuration of the manipulator 100 is represented by three larger squares and four smaller squares, as shown in FIG. 20(B). The oct-tree is an equivalent method of the quad-tree in 3-dimension comprising successive sub-divisions of a cube into eight cubes. It is to be noted that FIG. 20 does not depict the configuration space, but the actual physical space.

When either type of physical space decomposition is used, there are still many ways to furnish the calculation of the parameter dependences, but only the simplest way will be explained, for the case of a uniform partition.

In FIG. 21, the manipulator 100 with two joints, is shown with uniform quantization, where the rectangles containing the manipulator 100 are shadowed. It is noted that FIG. 21 also does not depict the configuration space, but the actual physical space.

Now, FIG. 22(A) depicts this manipulator 100 with its two joints straightened. In this case, there are eighteen rectangles containing the manipulator 100 as shown in FIG. 22(A).

Next, FIG. 22(B) depicts the manipulator 100 when only the second joint is moved by one unit of the quantization interval. In this case, there are nineteen rectangles containing the manipulator 100 as shown in FIG. 22(B), and, in particular, three shadowed rectangles not present in FIG. 22(A). Thus, the parameter dependence of the second joint is 3.

Similarly, FIG. 22(C) depicts the manipulator 100 when only the first joint is moved by one unit of the quantization interval. In this case, there are twenty rectangles containing the manipulator 100, as shown in FIG. 22(C), and, in particular, seven shadowed rectangles not present in FIG. 22(A). Thus, the parameter dependence of the first joint is 7.

The parameter dependences may also be evaluated with respect to a limited part of the manipulator 100, such as just with respect to the second joint, regardless of the state of the first joint.

As mentioned above, the quantization interval modifier 263 adjusts the quantization interval of the configuration space in accordance with results of comparison between the parameter dependences and the prescribed value. The prescribed value here indicates a desirable value for parameter dependences. For example, in the above example of parameter dependences obtained from FIG. 22, if the desirable value for the parameter dependences is given as 3, then the facts that the second joint already has the desirable parameter dependence, but the first joint does not. This will be found by the quantization interval modifier 263, upon comparison with respect to that prescribed value of 3. Subsequently, the quantization interval for the second joint angle will be unchanged, but that for the first joint angle will be modified to be three-seventh of what is was before.

Obviously, this particular manner of utilizing the parameter dependences and prescribed value can be variously modified, and no particular preference among many such possibilities is intended.

Now, the manner of carrying out the collision-free path search in this embodiment has been described. Different strategies can be devised by prescribing different values for the overall coefficient G and the coefficients $a(i)$ in equation (2) above. Since these coefficients affect the estimated distance h, which, in turn, affects the heuristic function f, different strategies result in different numbers of free space cells. But, the number of free space cells is proportional to the number of collision detections to be carried out, so the different strategies result in different efficiencies for performing the collision-free path search.

Figure 23:
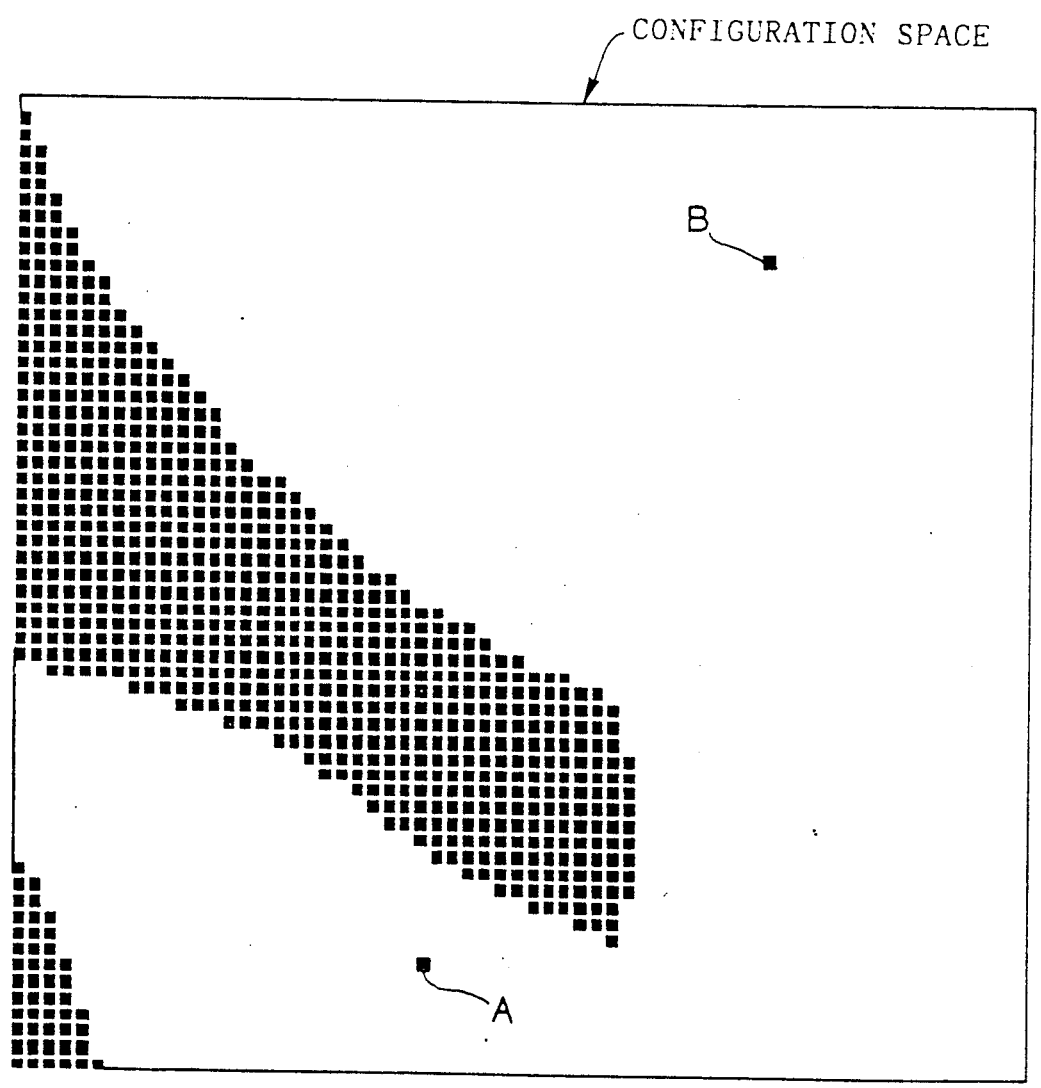
FIG. 23 is an illustration of an example of the configuration space to be used for explaining the manner of collision-free path search by the apparatus of FIG. 2.
Figure 24:
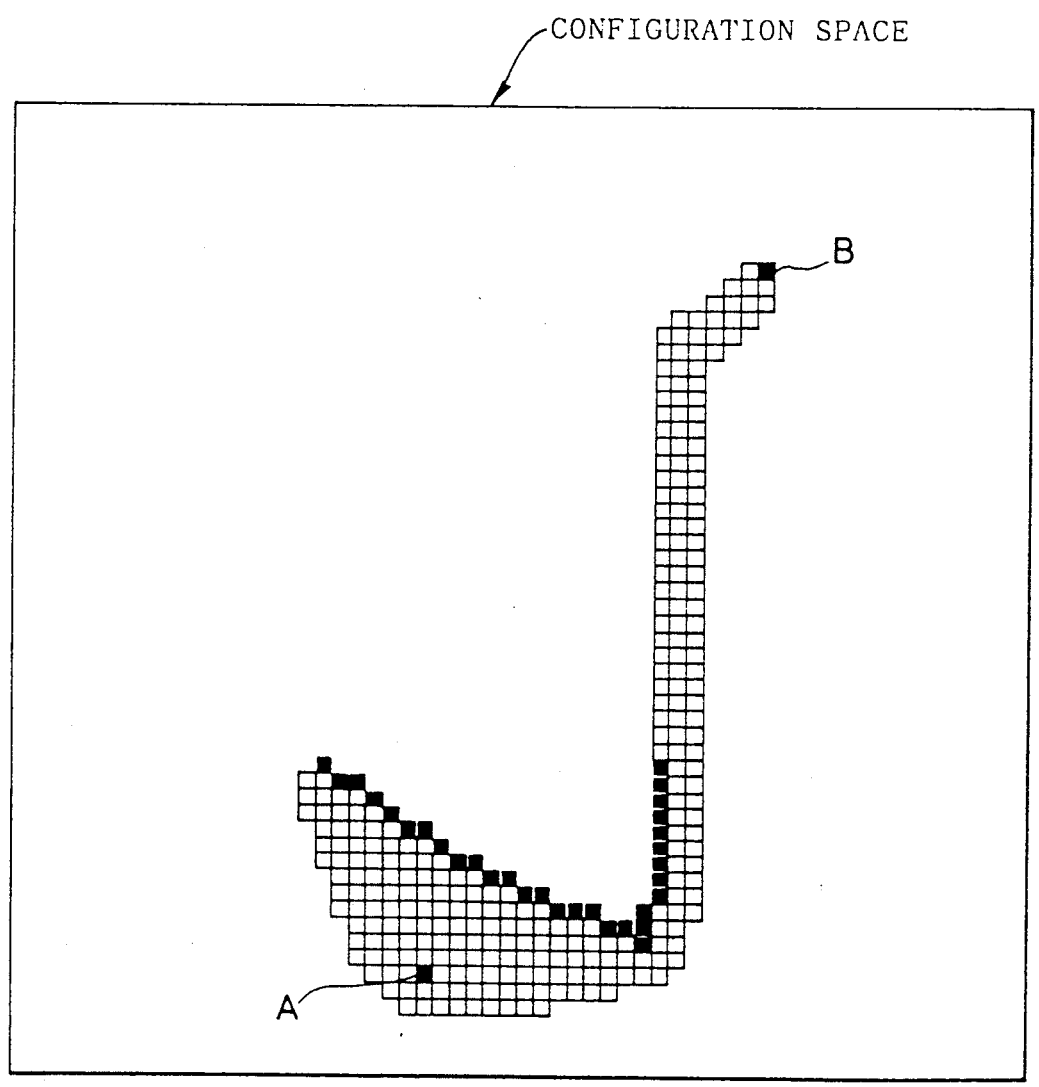
FIGS. 24-29 are illustration of free space enumerated for the configuration space of FIG. 23 by the apparatus of FIG. 2, for explaining the manner of collision-free path search by the apparatus of FIG. 2.
Figure 25:
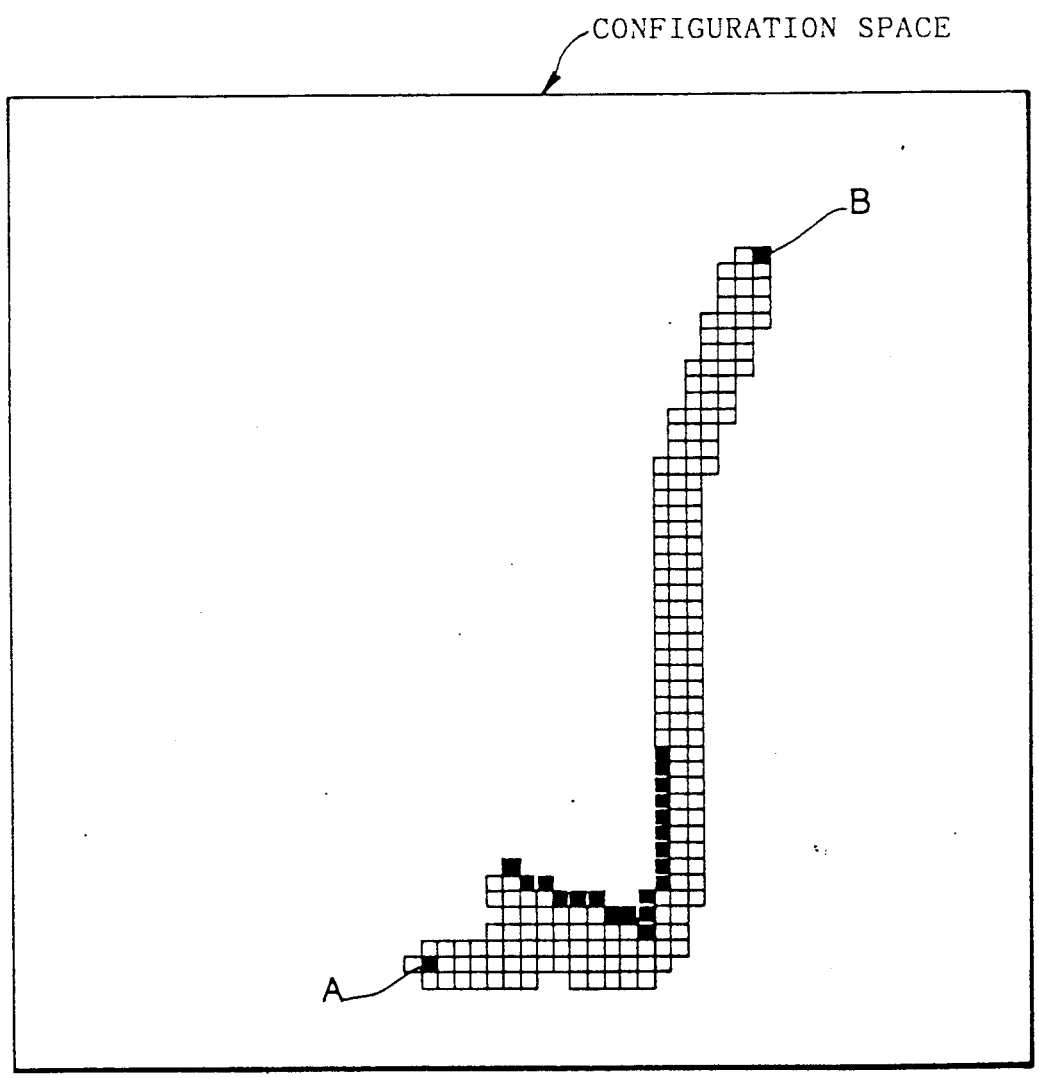
Figure 26:
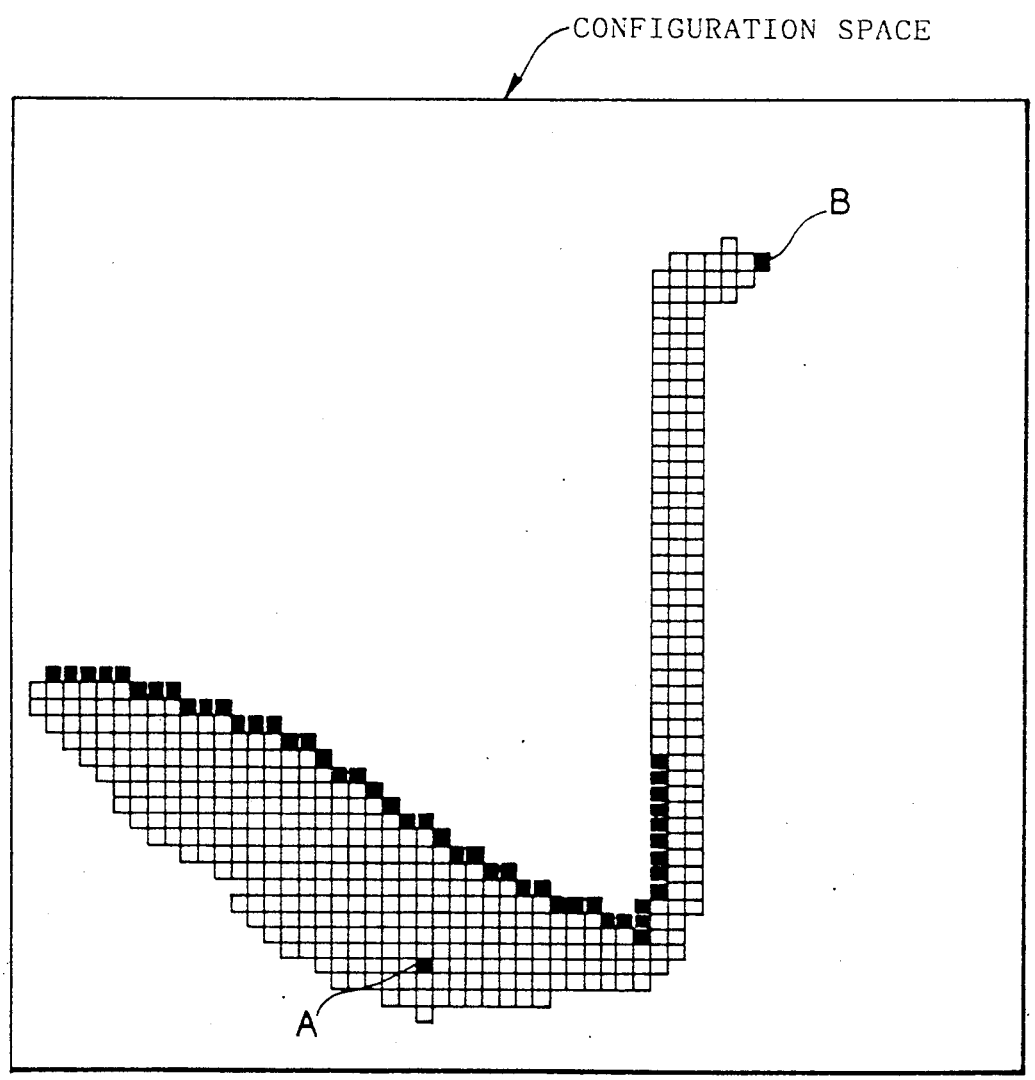

As an example, the collision-free path search for the situation of the configuration space shown in FIG. 23, where A and B are the initial and final points, respectively, as before, was performed with three different strategies. The resultant free space enumerated for the first case with $G=3$, $a(1)=1$, and $a(2)=1$ is shown in FIG. 24; for the second case with $G=3$, $a(1)=3$, and $a(2)=1$ is shown in FIG. 25; and for the third case with $G=3$, $a(1)=1$, and $a(2)=3$ is shown in FIG. 26. These results assert very clearly that the different strategies result in different numbers of free space cells. By inspecting these results, one can also conclude that, in this particular example, the second case shown in FIG. 25 is most efficient.

However, in general, it is not certain which one of the many possible strategies is most efficient. Even in the above example, if the vertical and horizontal axes was interchanged, the most efficient strategy would be the third case, not the second case.

For this reason, in this embodiment, a plurality of different strategies are used simultaneously in each collision-free path search. Then, either searches by less efficient strategies are stopped when the most efficient strategy finishes its search, or less efficient strategies are detected and dropped in the course of searching by inspections at intermediate moments.

Figure 27:
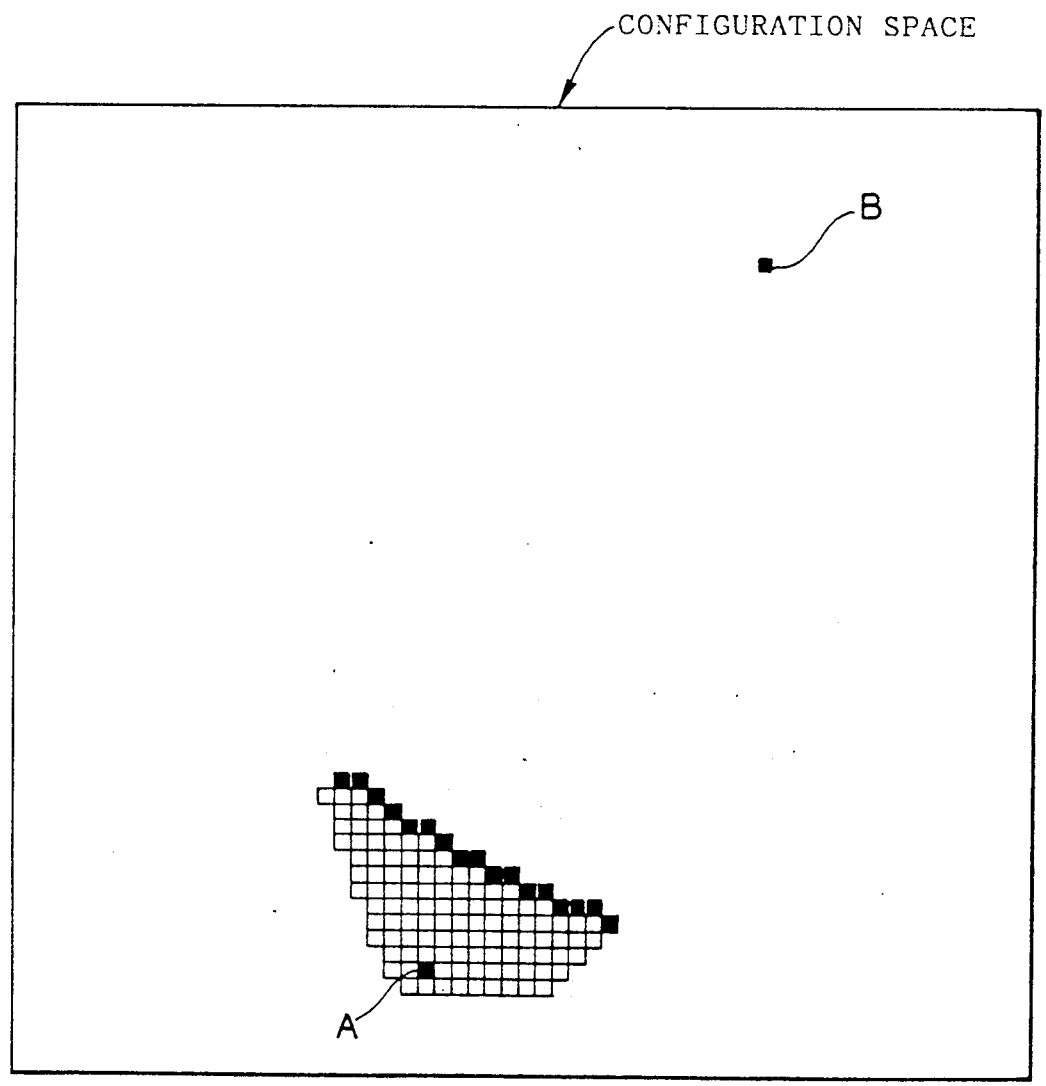
Figure 28:
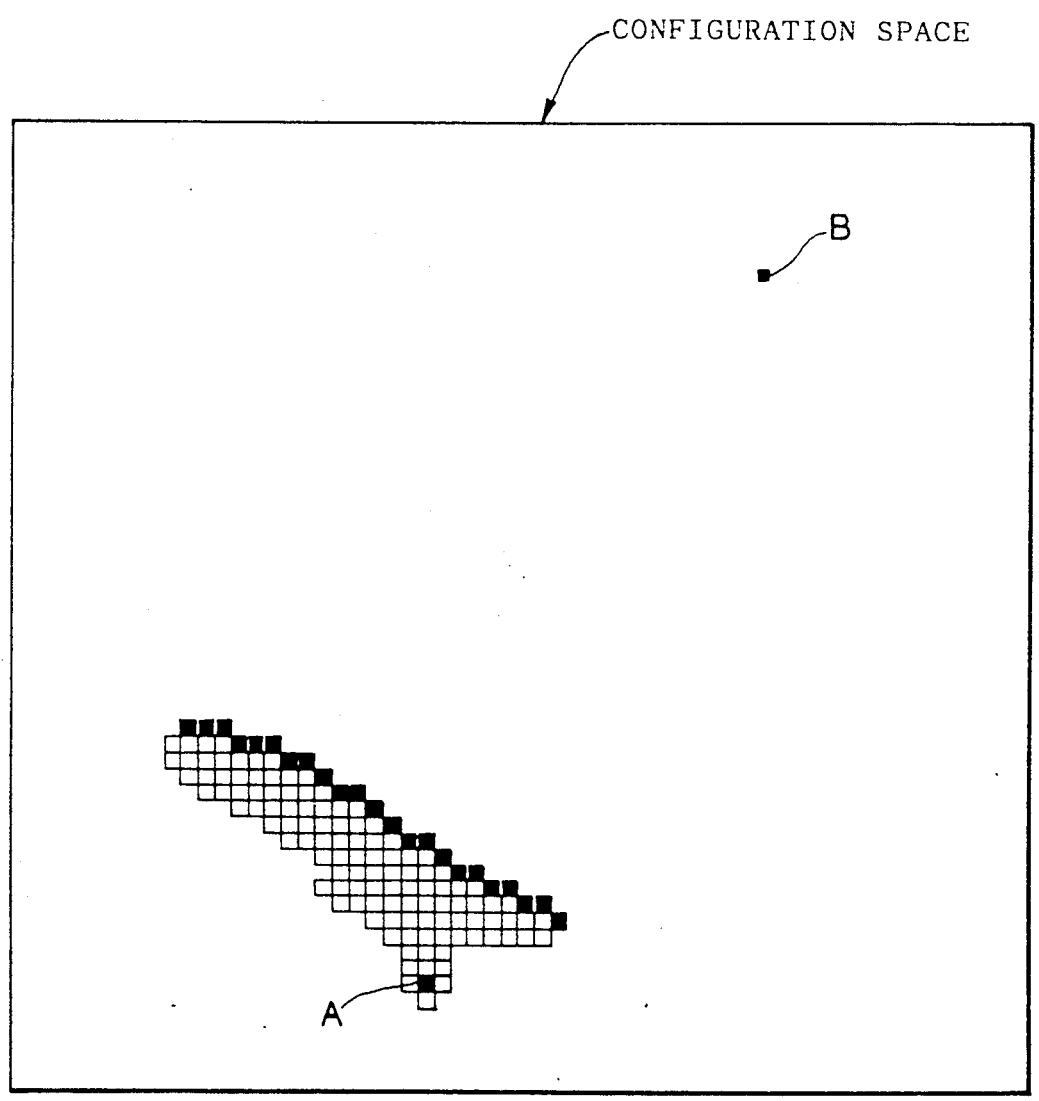
Figure 29:
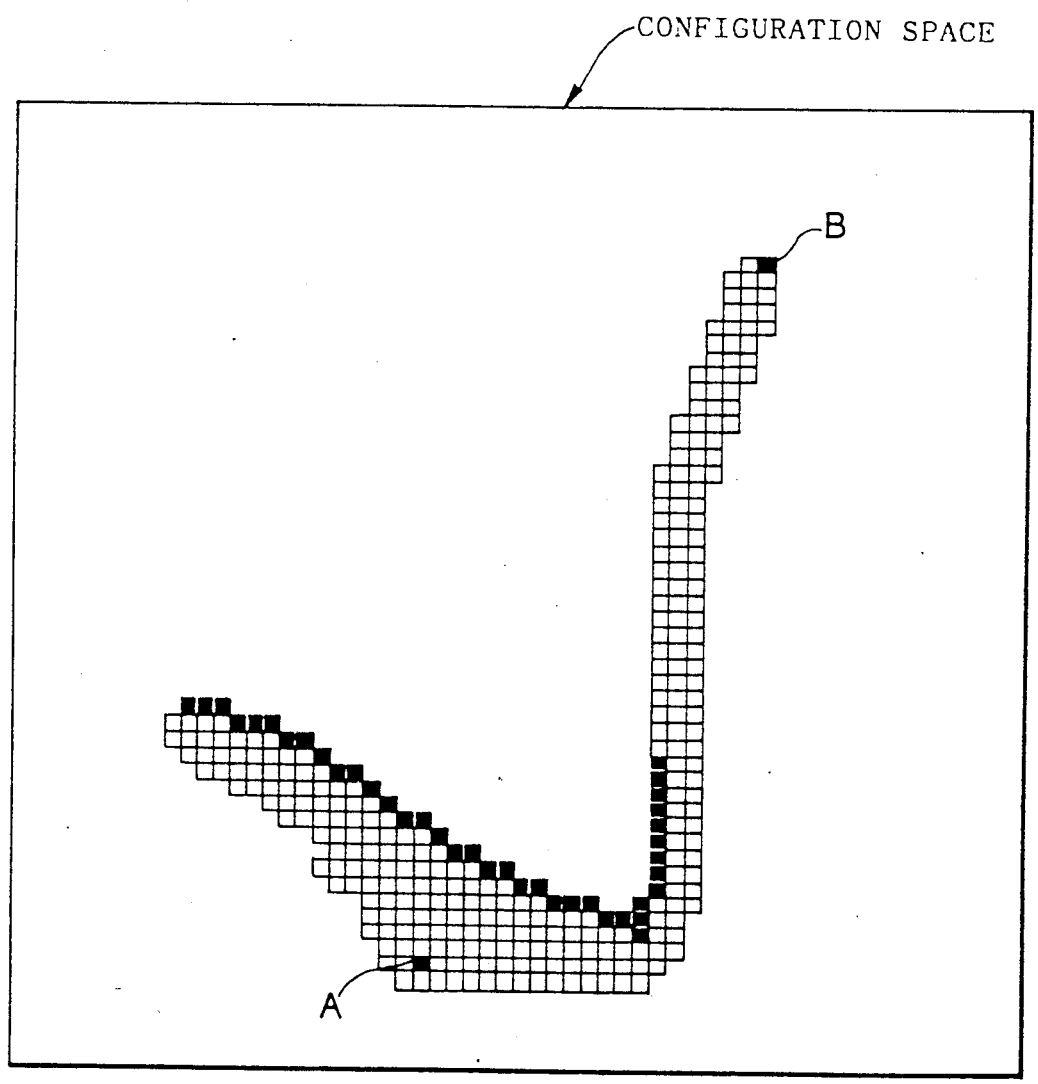

The reason that such a multi-strategical procedure can be effective is the following. For the above example in which three strategies are used, the second case of FIG. 25 finishes its search after 85 collision detections. At that moment, the first case and the third case were, as shown in FIGS. 27 and 28, respectively. Now, collision detection for each cell need to be done only once, so that even when three strategies are used simultaneously, those cells which are shared by more than one of these three strategies reduce the total number of the collision detections to be performed. In the above example, by superposing FIGS. 25, 27, and 28, one obtains FIG. 29, which has considerable numbers of cells in common with FIG. 25. Thus, the use of three different strategies simultaneously does not triple the total number of collision detections to be performed. In fact, it has been established that this multi-strategical procedure yields much more efficient results, in general, than taking risks with one strategy of uncertain efficiency.

The efficiencies of different strategies in general, and the values of coefficients in equation (2) are determined by trials from randomly selected values within a given range.

Figure 30:
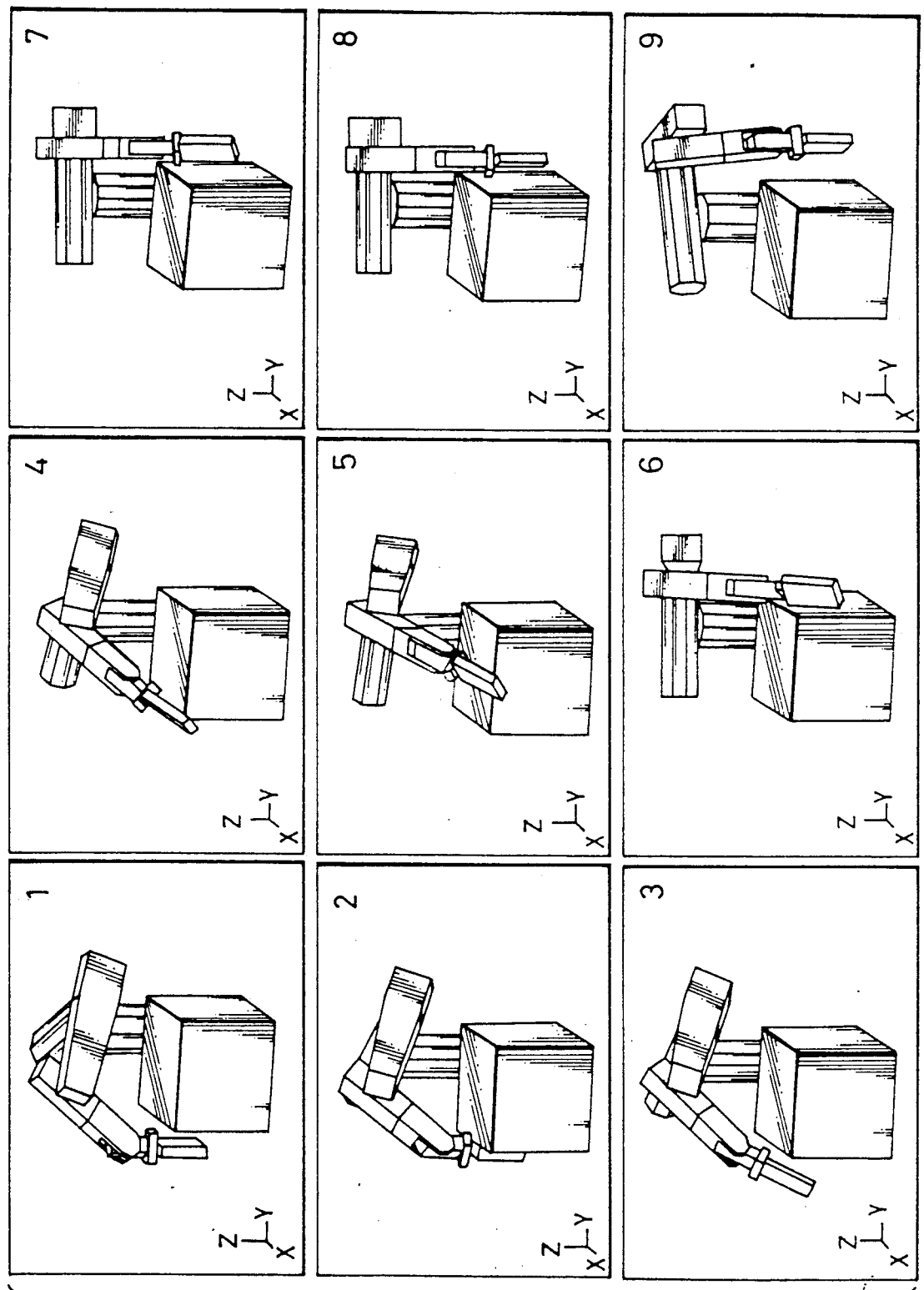
FIG. 30 is a sequential illustrations of the manipulator showing an example of motion to be planned by the apparatus of FIG. 2.
Figure 31A:
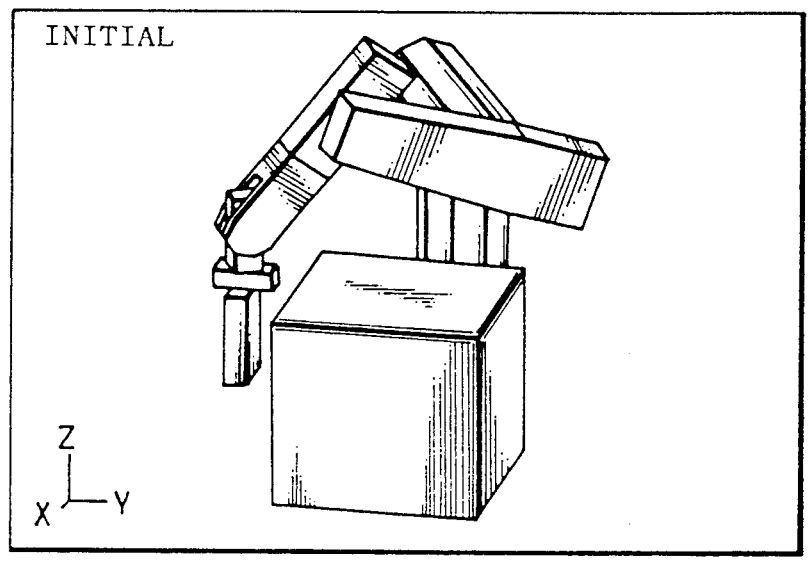
FIGS. 31(A) and 31(B) are illustration of an initial and final configuration of the manipulator in the motion shown in FIG. 30.

As an example, the collision-free path search was performed for a particular motion of a manipulator with six degree of freedom shown in FIG. 30 in sequential order, in which the initial and final configurations are shown in FIG. 31(A) and (B), respectively.

Figure 32:
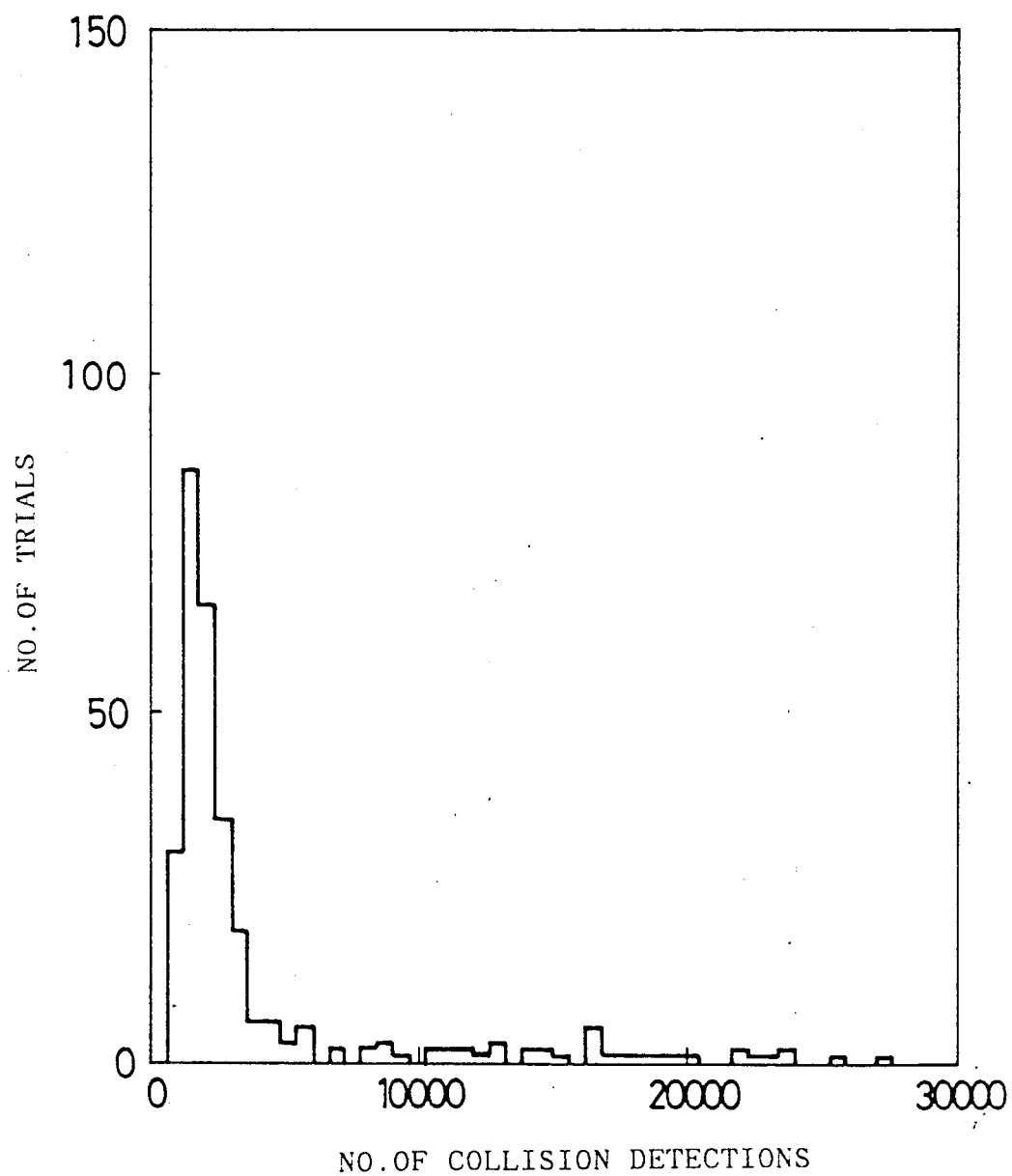
FIG. 32 is a histogram showing the distribution of the number of collision detections to be performed by different strategies of free space enumeration for the configuration of FIG. 31 by the apparatus of FIG. 2.

First, with $G=3$ fixed, free space enumerations for this motion were performed 300 times in which the other coefficients $a(i)$, $i=1$ to 6, were chosen randomly within a range of 1 to 9. This yields the histogram shown in FIG. 32, which shows the distribution among 300 trials of free space enumeration of the number of collision detections performed. As seen in FIG. 32, most trials required relatively small number of the collision detections, but some trials in which evidently inappropriate values were chosen for the coefficients $a(i)$ required very large number of the collision detections.

Next, the range for the coefficients $a(i)$ is independently set for each coefficient $a(i)$ such that the range is narrower for a coefficient with smaller difference between the initial point and the final point. Namely, when the j-th coefficient a(j) has a largest difference between the initial point and the final point, the upper limit of the range r(i) is determined by:

$$r(i) = 3 + 6 \times |Ic(i) - Fc(i)| / |Ic(j) - Fc(j)| \quad (3)$$

where Ic(i) and Fc(i) are values of the i-th parameter at the initial and final points, respectively. Equation (3) gives a range between 1 and 3 for a coefficient which has the same value at the initial point and final point, whereas for a coefficient with the largest difference between the initial point and the final point a range between 1 and 9 will be obtained. The trials of 300 free space enumerations similar to the above with these ranges for the coefficients a(i) yielded the histogram shown in FIG. 32 which also shows the distribution among 300 trials of free space enumeration in number of the collision detections performed. As can be seen from FIG. 33, the number of the free space enumeration requiring large numbers of the collision detections to be performed decreased in this case, compared with the previous case of FIG. 32.

This can be explained as follows. In the free space enumeration, choices are made successively for those cells which bear more relevancy to the collision-free path search, which in the above example are those with smaller values for the heuristic function. On the other hand, when there are cells for which a certain parameter has a value outside of the range between the initial value and the final value, the coefficient c corresponding to this parameter and therefore the heuristic function itself increase in proportion to how far this value is from the range. Here, the proportionality for the increase in the heuristic function tends to be greater as the coefficients a(i) become larger. This implies that for a parameter with a larger corresponding coefficient, the values for this parameter tend more likely to be in the range between the initial and final values. Thus, in a situation where a parameter varies greatly outside the range between the initial and final points, in order to avoid a collision, the larger coefficient will be confined within the narrower range, which prevents necessary cells from being chosen, so that the free space enumeration becomes less effective. In other words, to avoid this type of situation from arising, parameters with small difference between the initial and final points need to be kept small.

It is to be noted that the equation (3) above may be replaced by other expressions such as:

$$r(i) = 2 + 7 \times |Ic(i) - Fc(i)| / |Ic(j) - Fc(j)| \quad (4)$$

or, $$r(i) = 3 + 6 \times \sqrt{|Ic(i) - Fc(i)| / |Ic(j) - Fc(j)|} \quad (5)$$

Figure 33:
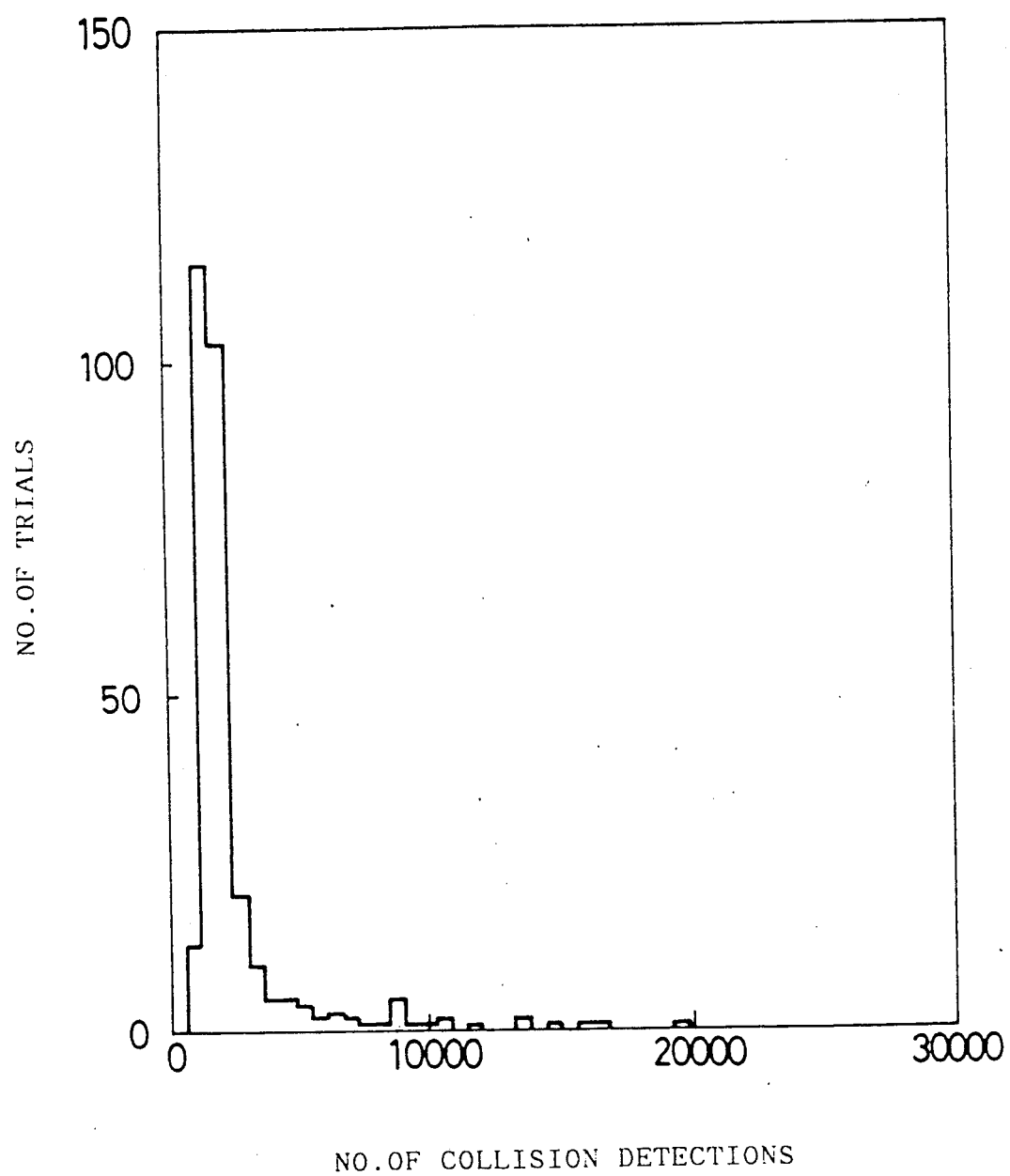
FIG. 33 is a histogram showing the distribution of the number of collision detections to be performed by different strategies of free space enumeration by the apparatus of FIG. 2.

It has already been observed from FIG. 33 that, although this type of setting of the ranges for coefficients, improves the efficiencies of the strategies, there are still some values of coefficients which require large numbers of collision detections to be performed. This situation can be further improved by using the multi-strategical procedure explained above. The trials of 300 free space enumerations similar to the above with the independently set ranges for the coefficients a(i) as above, but now by the multi-strategical procedure using four different strategies simultaneously yielded the histogram shown in FIG. 34 which also shows the distribution among 300 trials of free space enumeration in numbers of collision detections performed. It can be seen from FIG. 34 that the collision detections were performed at most 6574 times in these 300 trials, in contrast to the case of FIG. 32 in which the collision detections were performed at most 59789 times in 300 trials.

Figure 35:
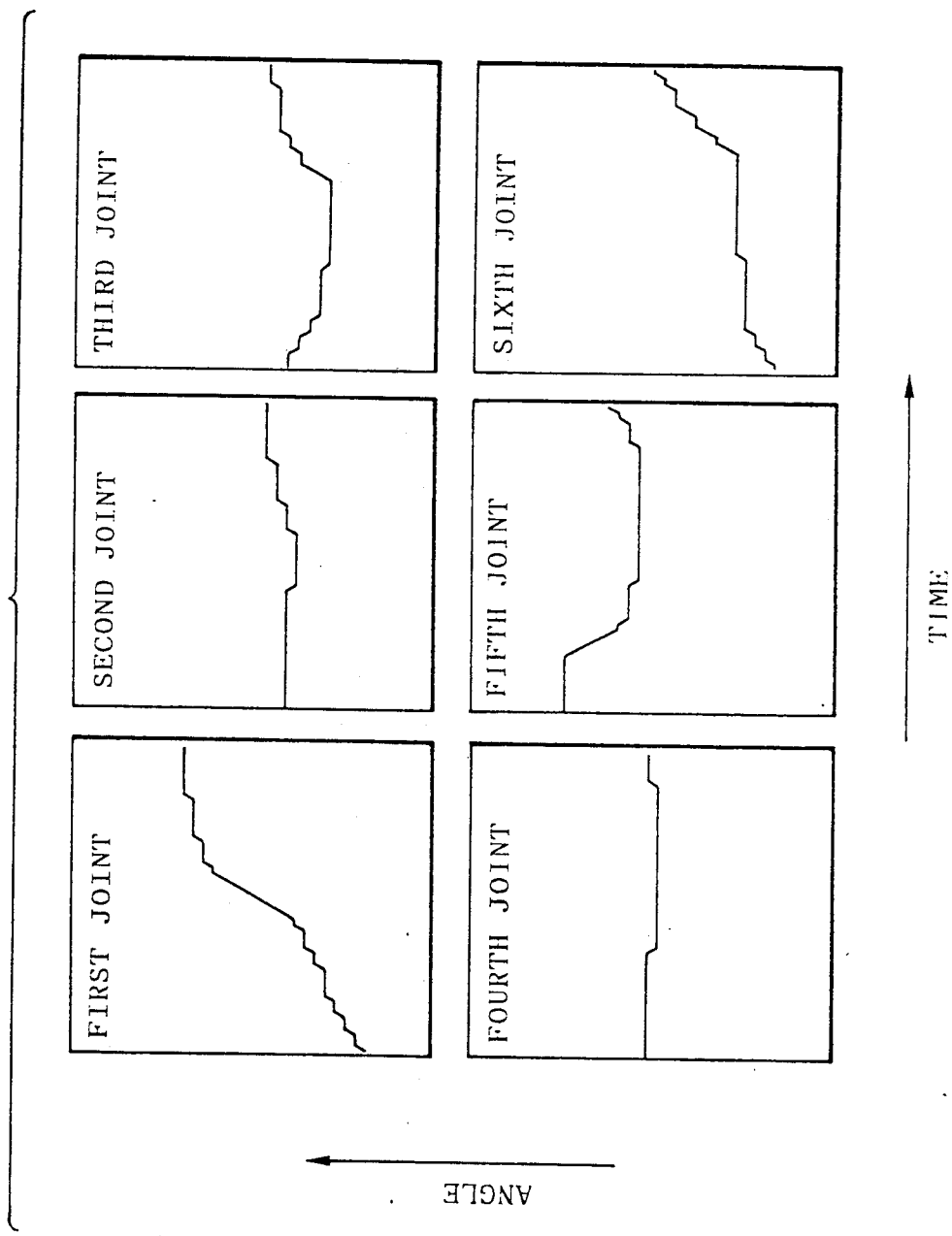
FIG. 35 is graph showing the collision-free path found for the configuration of FIG. 31 by the apparatus of FIG. 2.

The resultant collision-free path found is indicated in FIG. 35 which shows changes of each of six joint angles in time sequence.

Thus, by setting the range for the coefficients a(i) independently for each coefficient a(i), such that the range is narrower for a coefficient with smaller difference between the initial point and the final point, and using the multi-strategical procedure, the free space enumeration can be made considerably more efficient.

Figure 36A:
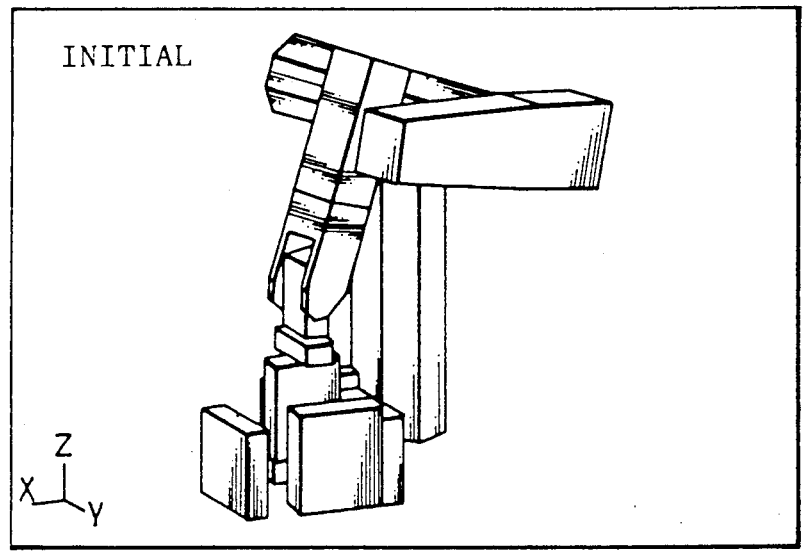
FIG. 36(A) and 36(B) are illustrations of an initial and final configuration of the manipulator in the motion planned by the apparatus of FIG. 2.
Figure 36B:
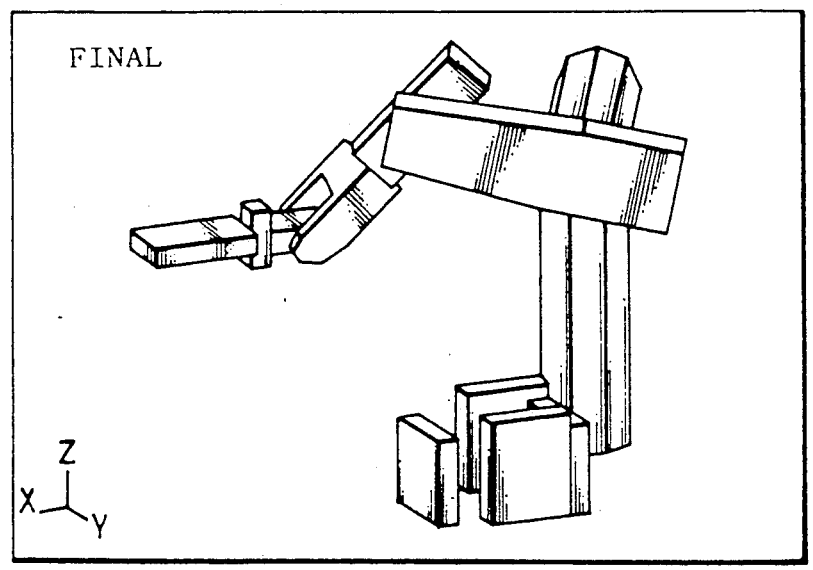
Figure 37A:
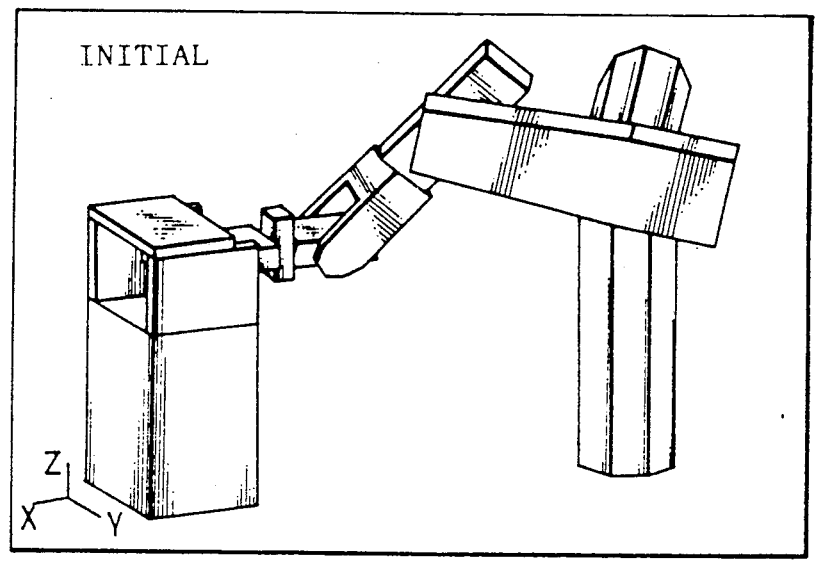
Figure 37B:
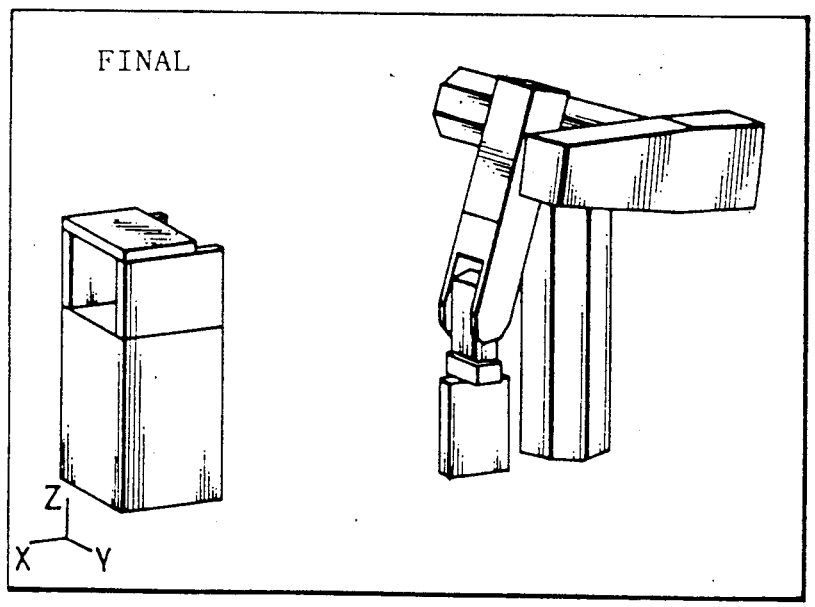
Figure 38A:
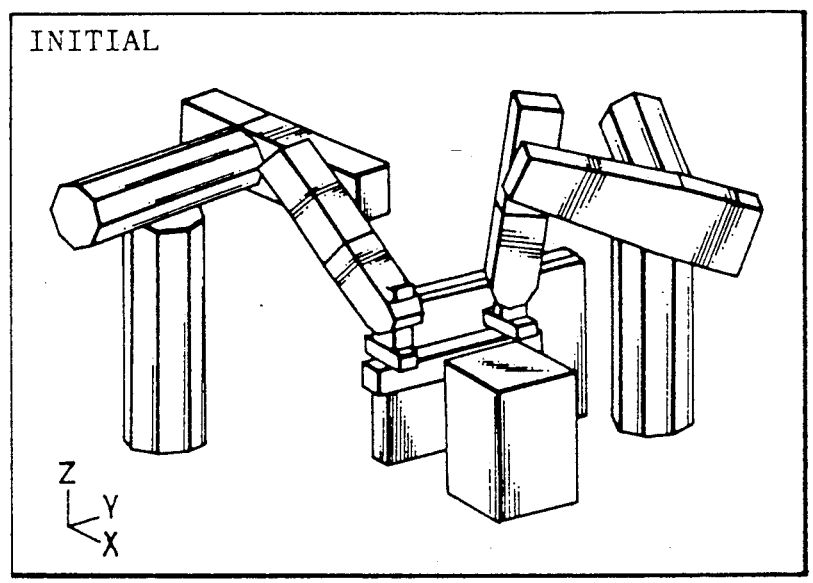
FIG. 38 (A) and 38(B) are illustrations of an initial and final configuration of the manipulator in the motion planned by the apparatus of FIG. 2.
Figure 38B:
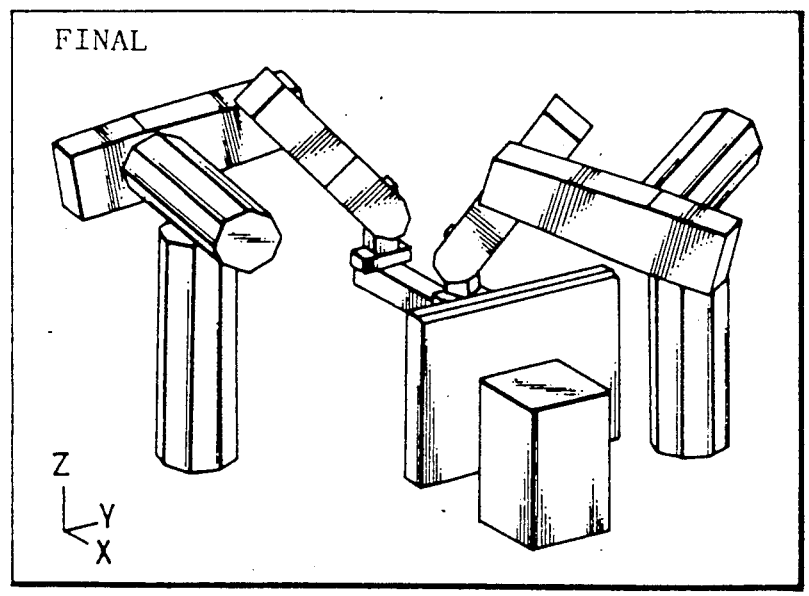

Further observations can be obtained from other examples of the collision-free path search for three different motions of the same manipulator with six degrees of freedom, of which the initial and final configurations corresponding to FIG. 31(A) and (B) of the previous example are shown in FIGS. 36, 37, and 38. Among these, the last one, shown in FIG. 38, actually involves two such manipulators with six degrees of freedom cooperating. However, by excluding those points from the free space for which the cooperation by two manipulators becomes impossible, i.e., those for which two manipulators can move independently, the problem reduces to that involving six degrees of freedom of one manipulator, as the configuration of the other manipulator can be derived backwards from that of the one manipulator. Thus, in this last example, such configurations for which the cooperation by two manipulators becomes impossible, i.e., for which the configuration of the other manipulator cannot be derived backwards, are also regarded as causing collisions.

Figure 39:
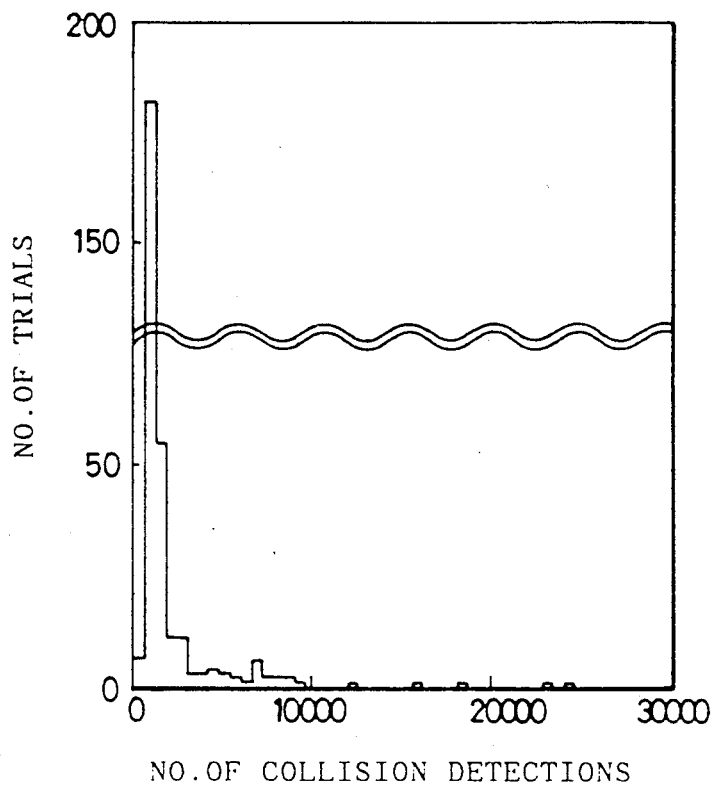
FIG. 39 is a histogram showing the distribution of the number of collision detections to be performed by different strategies of free space enumeration of the configuration of FIG. 36 by the apparatus of FIG. 2.
Figure 40:
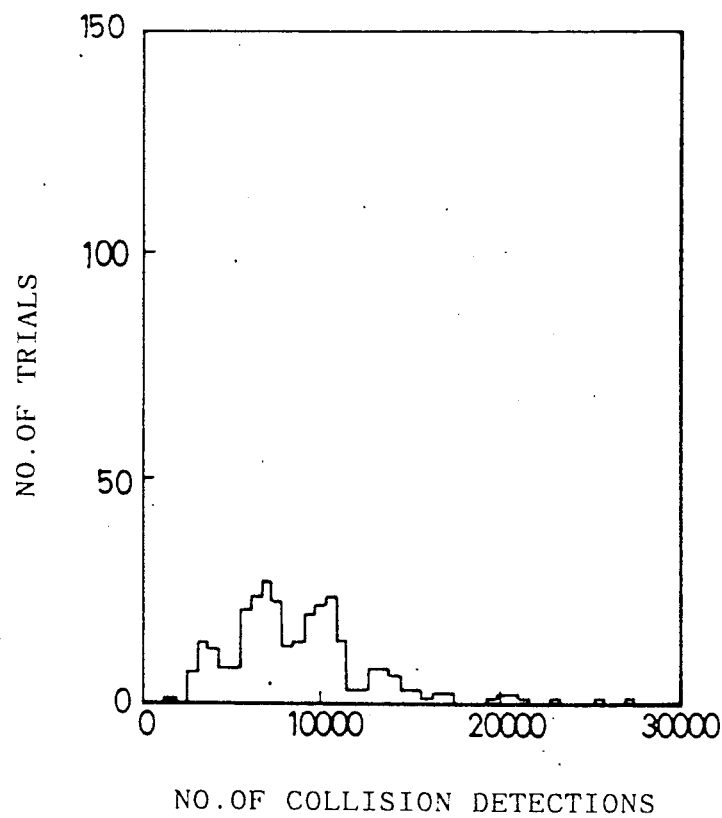
FIG. 40 is a histogram showing the distribution of the number of collision detections to be performed by different strategies of free space enumeration for the configuration of FIG. 37 by the apparatus of FIG. 2.
Figure 41:
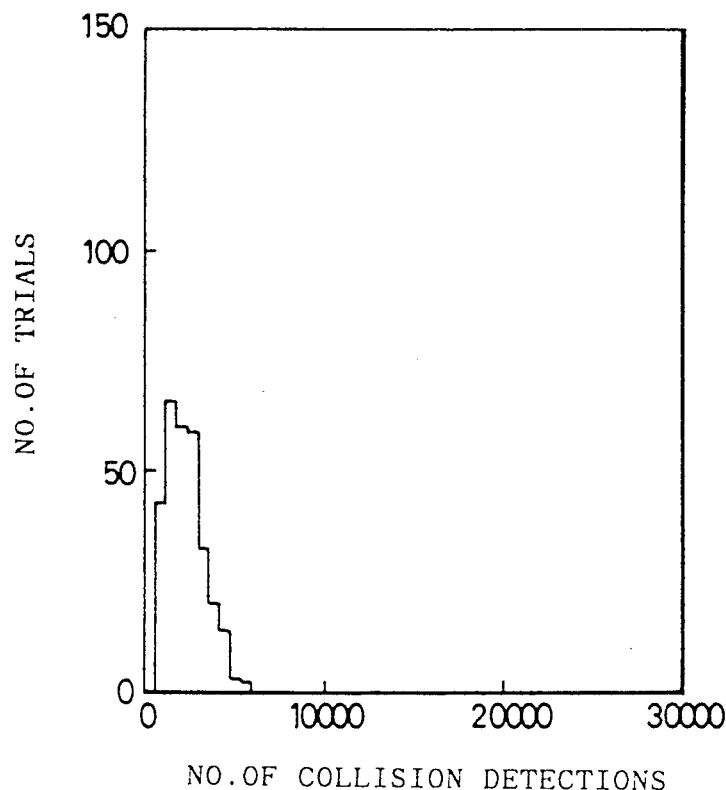
FIG. 41 is a histogram showing the distribution of the number of collision detections to be performed by different strategies of free space enumeration for the configuration of FIG. 38 by the apparatus of FIG. 2.

The histograms showing the distributions among 300 trials of free space enumeration in numbers of collision detections performed, corresponding to FIG. 32 of the previous example, for these three cases of FIGS. 36, 37, and 38 are shown in FIGS. 39, 40, and 41, respectively. As can be seen from FIGS. 39, 40, and 41, more often only small numbers of collision detections are called for in all of these three cases.

Figure 34:
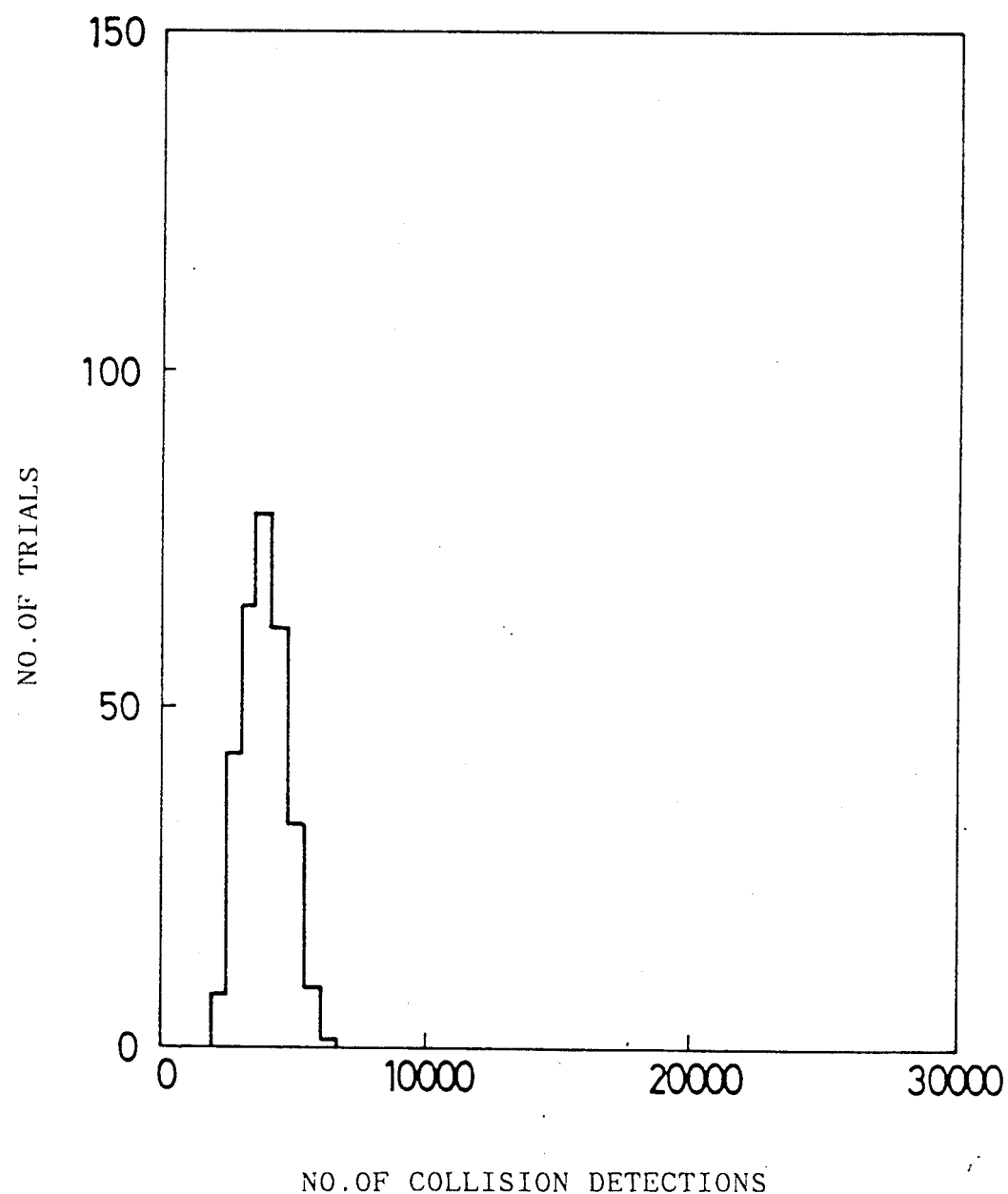
FIG. 34 is a histogram showing the distribution of the number of collision detections to be performed by different strategies of free space enumeration by the apparatus of FIG. 2.
Figure 42:
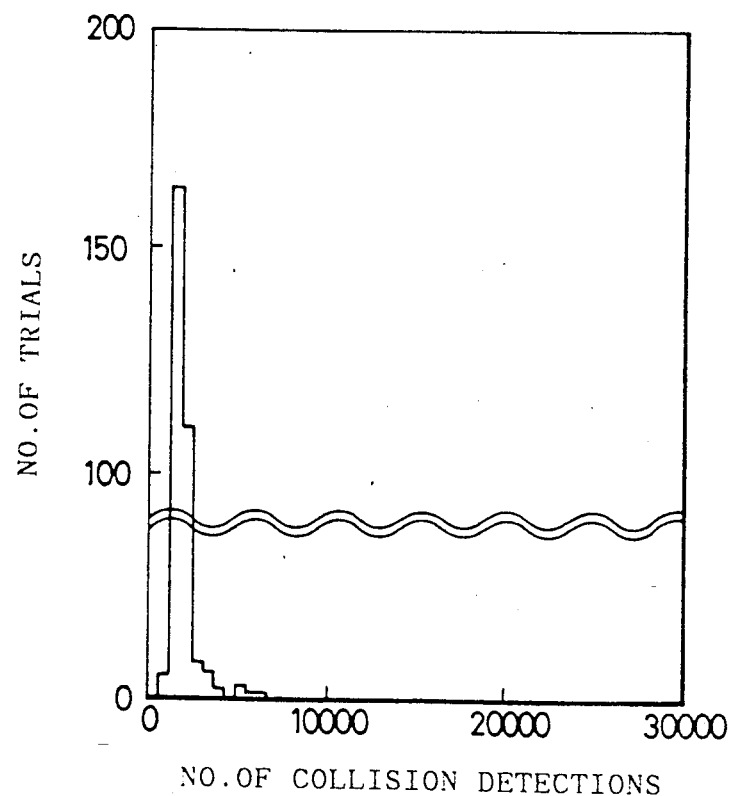
FIG. 42 is a histogram showing the distribution of the number of collision detections to be performed by different strategies of free space enumeration for the configuration of FIG. 36 by the apparatus of FIG. 2.
Figure 43:
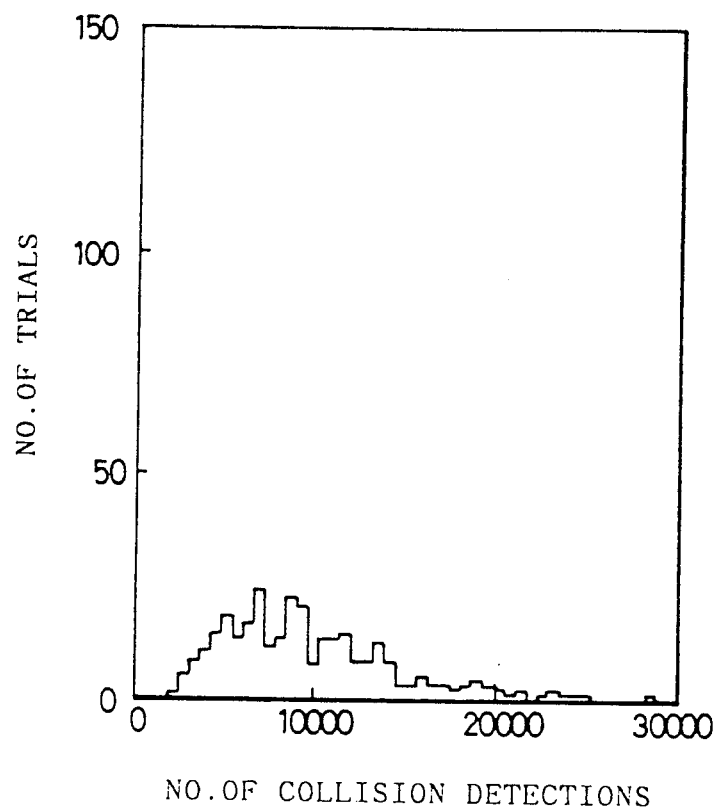
FIG. 43 is a histogram showing the distribution of the number of collision detections to be performed by different strategies of free space enumeration for the configuration of FIG. 37 by the apparatus of FIG. 2.
Figure 44:
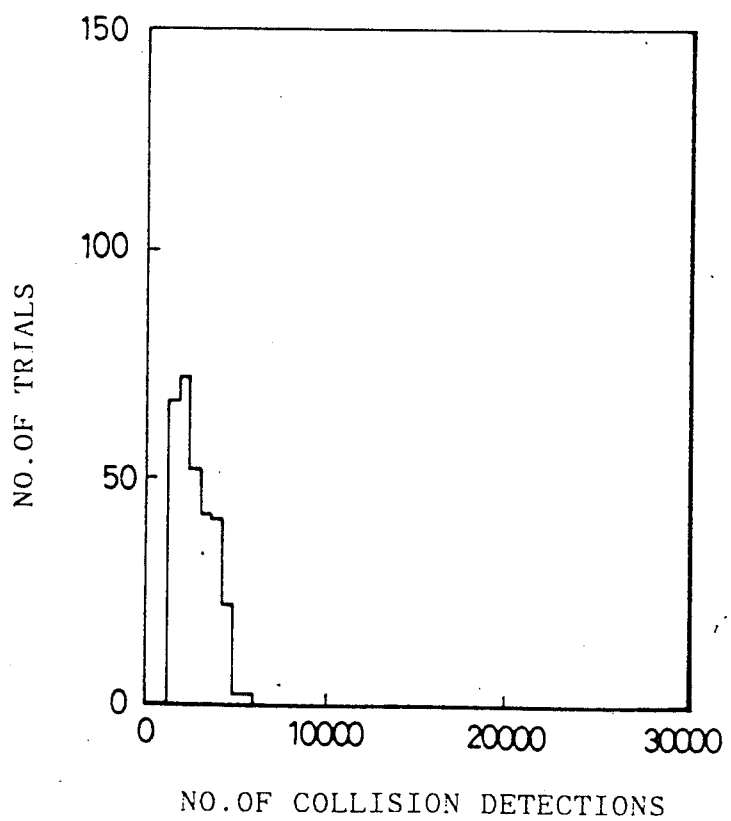
FIG. 44 is a histogram showing the distribution of the number of collision detections to be performed by different strategies of free space enumeration for the configuration of FIG. 38 by the apparatus of FIG. 2.

The similar histograms obtained by the multi-strategical procedure using four different strategies simultaneously, corresponding to FIG. 34 of the previous example, are shown in FIGS. 42, 43, and 44, respectively. Although the difference between the single strategy procedure and the multi-strategical procedure is not as prominent in any of these three cases as in the previous examples of FIGS. 32 and 34, FIGS. 42, 43, and 44, all show that the multi-strategical procedure is at least as effective as the single procedure, if not more so.

Figure 45:
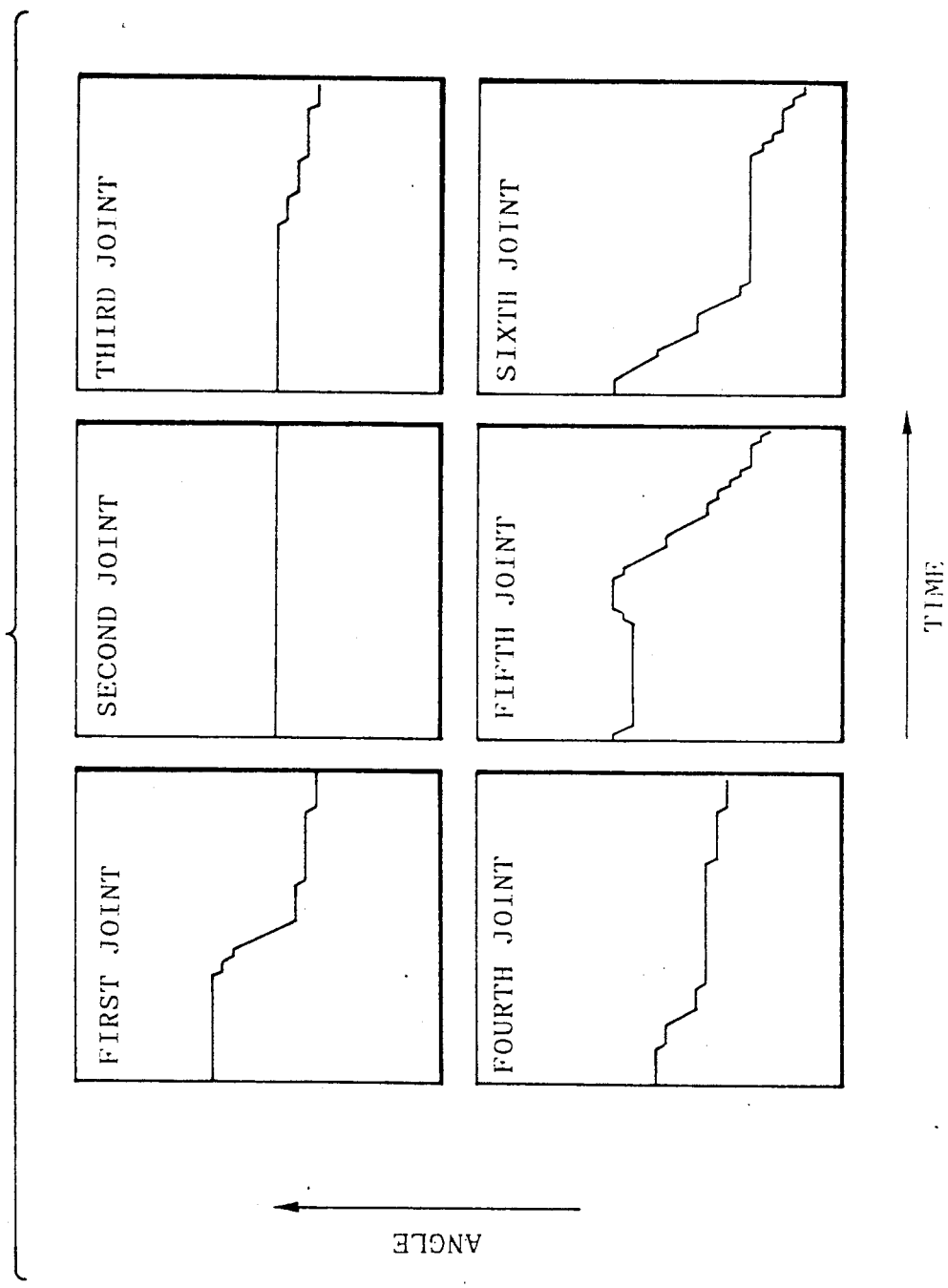
FIG. 45 is a graph showing the collision-free path found of the configuration of FIG. 36 by the apparatus of FIG. 2.
Figure 46:
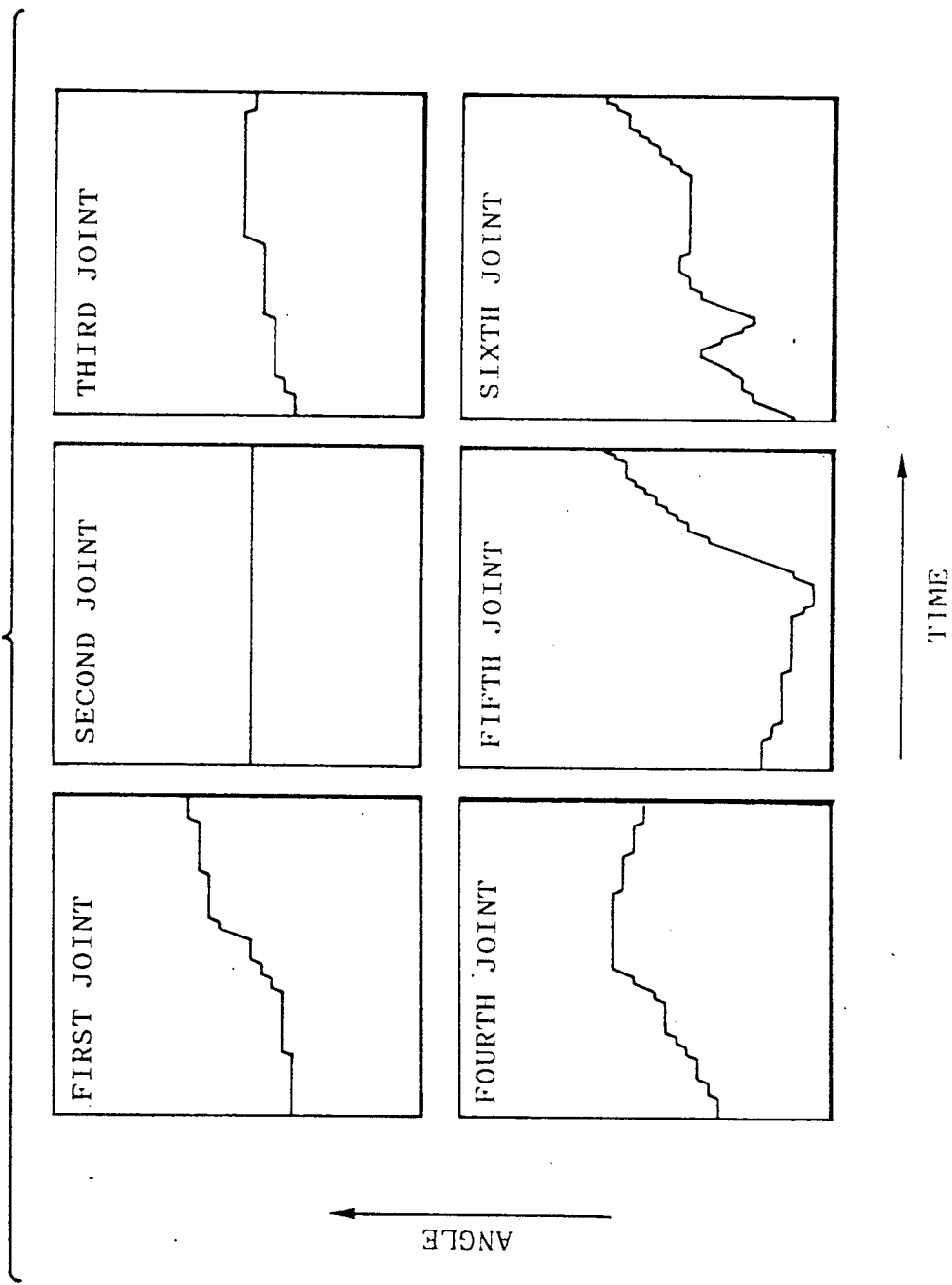
FIG. 46 is a graph showing the collision-free path found for the configuration of FIG. 37 by the apparatus of FIG. 2.

Finally, equivalents for these three cases of FIG. 35 for the previous example, which shows the resultant collision-free paths found in terms of changes of each of six joint angles in time sequence, are shown in FIGS. 45, 46, and 47.

From the configuration shown in FIG. 36, this case may seems to present some elaboration in avoiding the obstacles, but FIG. 45 shows that the changes in six joint angles are rather straightforward, implying the fact that the free space in the configuration space is not so complicated as might be assumed from the complexity of the physical configuration. This also explains the fact, shown in FIG. 42, that the free space enumeration can be very effectively performed in this case.

Figure 31B:
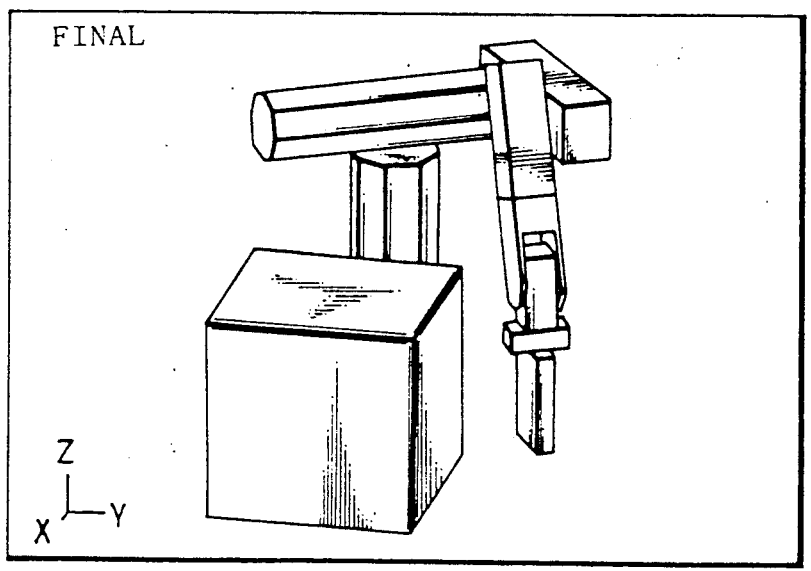

On the other hand, from the configuration shown in FIG. 37, a great deal of elaboration is expected in pulling out an object from a box. In fact, FIG. 46 shows that the fifth joint have to be moved away from the final position at a time, and the sixth joint angle must go through rather quick and large changes. In cases like this one, the free space can be very complicated, so that the free space enumeration needs to cover widely spread regions. Meanwhile, the obstacles tend to limit the spread of the regions to be covered in the free space enumeration by their sheer presence, so that the fluctuation in the number of the collision detections to be performed in this case chiefly comes from the complexity of the physical configuration. This accounts for rather wide fluctuations shown in both FIGS. 43 and 46. It is worthwhile to note in this respect that the case of FIG. 37 is in sharp contrast to those of FIGS. 31 and 36 in which the simplicity of the physical configuration makes the number of the collision detections to be performed depend largely on the type of strategy to be used, so that the efficiencies drop sharply for inappropriate strategies.

Lastly, the configuration of FIG. 38 also seems to promise a great deal of elaboration, but FIGS. 44 and 47 show that the free space in the configuration space is not so complicated as might be conjectured from the complexity of the physical configuration, as in the case of FIG. 36 above.

Mention has already been made of the fact that in this embodiment, a plurality of different strategies are used simultaneously in each collision-free path search, and searches by less collision-free path search. Then, either searches by less efficient strategies are stopped when the most efficient strategy finish its search, or less efficient strategies are detected and dropped in the course of searching by inspections at intermediate moments. Of the two, the latter way of detecting the less efficient strategies in the course of searching by inspections at intermediate moments can be more efficient as inconsequential searches by the less efficient strategies do not continue unduly. Inspections at intermediate moments are carried out in terms of a quantity P defined for a point in the configuration space by:

$$P = C^N / F \tag{6}$$

where C is a number of cells from the initial point to the point, N is a dimensionality of the configuration space, and F is a total number of cells in the free space already enumerated for reaching the point. Thus, the larger P becomes, the more efficient free space enumeration is, since the larger P indicates that more free space has already been enumerated within a given region of search.

This quantity P is calculated whenever the collision detection for a cell is performed, and the efficiencies are estimated at intermediate moments as an average of the quantities P for last several collision detections. Also, the rate of expansions of cells in the free space enumeration are slowed down in accordance with the efficiencies as they are estimated, so that the free space enumerations by inefficient strategies do not proceed too far before the most efficient strategy finishes its free space enumeration.

To be more specific, for a case in which the number of strategies to be used is NS, a certain numbers of expansions are carried out for each of the NS strategies in one search, successively. Now, this number $NE_i(j)$ of expansions to be performed by i-th strategy in j-th search is determined as follows. At first, as the efficiencies are not known, the number $NE_i(j)$ is the same for all NS strategies, i.e., $$NE_i(1) = NE_{ini} \tag{7}$$

i = 1 to NS and the quantity P is calculated for all the expanded cells. When j-th search is completed for all of NS strategies, the efficiency $P_i(j)$ of i-th strategy in that j-th search is determined as an average of the quantity P for last NP cells expanded in that j-th search by the i-th strategy, where NP is a prescribed number. The the number $NE_i(j)$ of expansions to be carried out is then defined in terms of this efficiency $P_i(j)$ by the expression:

$$NE_i(j) = \frac{NE_{ini} \cdot P_i(j-1)}{\max\{P_1(j-1), \ldots, P_{NS}(j-1)\}} \tag{8}$$

so that, although the searches start out for all the strategies in a similar fashion, the free space enumerations by inefficient strategies do not proceed too far before the most efficient strategy finishes its free space enumeration. Thus, in this manner, useless searches by inefficient strategies can be spared, and the tendency for the search region to widen in the multi-strategical search, compared with single strategy search, can be suppressed.

The histograms of FIGS. 42, 43, and 44, which are obtained by the multi-strategical procedure using four different strategies simultaneously, were obtained with such inspections at intermediate moments in which the inspections are conducted after every 50 cell expansions, and each efficiency is estimated as an average of the quantities P for last 20 collision detections, i.e., $NE_{ini} = 50$ and $NP = 20$.

As described, according to this embodiment, it is possible for motion planning using free space enumeration to have general applicability to various types of moving objects, and, at a same time, be capable of reducing amounts of information and calculations involved in obtaining motion for objects with multiple degrees of freedom, because of the particular manner of enumerating free space and searching collision-free path.

It is also possible, according to this embodiment, for motion planning using free space enumeration to be capable of modifying a path and a space obtained in a simplified manner to be more practical ones, because of the collision-free path modifying unit 28.

In addition, according to this embodiment, it is possible for the motion planning using free space enumeration to be capable of setting up appropriate configuration space partitions for different parameters of the configuration space automatically, because of the space partition unit 26.

Furthermore, according to this embodiment, it is possible for the motion planning using free space enumeration to be capable of adopting appropriate strategy for free space enumeration in accordance with a type of a moving object and environmental conditions of the moving object, because of the particular manner the free space enumeration is to be performed.

It is to be noted that many modifications and variations of this embodiment, besides these already mentioned in the foregoing, may be made without departing from the novel and advantageous features of the present invention. Accordingly, all such modifications and variations are intended to be included within the scope of the appended claims.

What is claimed is:

1. An apparatus for collision-free path determination using free space enumeration, in which configurations of a physical object and surrounding physical obstacles are represented by a configuration space defined in terms of degrees of freedom of the object, the configuration space being divided up into a multiplicity of cells defined in terms of intervals in the degrees of freedom, in which a path of the object between a given initial point in the configuration space from which the path starts and a given final point in the configuration space at which the path ends is to be determined, the apparatus comprising:
   means for enumerating a continuous free space between the initial point and the final point in which the path can be located, including:
   means for selecting cells which satisfy a prescribed condition, between the initial point and the final point, by simultaneously using a plurality of strategies for selecting the cells; and
   means for checking an occurrence of a collision between the object and the surrounding obstacles in the selected cells;
   means for determining a collision-free path in the free space joining the initial point and the final point; and
   means for controlling a position of the physical object with respect to the physical obstacle according to the determined collision-free path.

2. The apparatus of claim 1, wherein all the selections by the plurality of strategies discontinues when the cells selected by one of the strategies succeed to connect the initial point and the final point continuously.

3. The apparatus of claim 1, wherein the selecting means further including:
   means for inspecting progress of the selection by each of the plurality of strategies at intermediate points between the initial point and the final point; and
   means for deterring the selections by those strategies found by the inspections to be slower in progress than at least one of the other strategies.

4. The apparatus of claim 3, wherein the inspecting means utilizes a quantity P defined for a point in the configuration space by:

$$P = C^N/F$$

where C is a number of cells from the initial point, N is a dimensionality of the configuration space, and F is a total number of cells in the free space already enumerated.

5. The apparatus of claim 1, wherein the selecting means selects cells according to a heuristic function defined for each cell as $f = c + h$ where c is a number of cells from the initial point and h is an estimated number of cells to the final point such that the cell for which the heuristic function takes a minimum value and wherein the different strategies being given by the estimated number of cells h are different.

6. The apparatus of claim 5, wherein the estimated number of cells h at a particular cell is obtained as:

$$h = G \times \sqrt{\Sigma a(i) \times [c(i) - Fc(i)]^2}$$

where G is an overall coefficient, each a(i) is a coefficient for each degree of freedom of the object, c(i) is a value of i-th degree of freedom at the particular cell, and Fc(i) is a value of i-th degree of freedom at the final point, and wherein the different strategies being given by at least one of the overall coefficient G and coefficients a(i) different from each other.

7. The apparatus of claim 6, wherein at least one of the overall coefficient G and coefficients a(i) are determined within a prescribed range of values given for each.

8. The apparatus of claim 7, wherein those of the overall coefficient G and coefficients a(i) which are to be determined within a prescribed range of values given for each, are determined as a random number within the range.

9. The apparatus of claim 7, wherein the range is narrower for a coefficient which has a smaller difference between the initial point and the final point.

10. An apparatus for collision-free path determination using free space enumeration, in which configurations of a physical object and surrounding physical obstacles are represented by a configuration space defined in terms of degrees of freedom of the object, the configuration space being divided up into a multiplicity of cells defined in terms of intervals in the degrees of freedom, in which a path of the object between a given initial point in the configuration space from which the path starts and a given final point in the configuration space at which the path ends is to be determined, the apparatus comprising:
   means for enumerating a continuous free space between the initial point and the final point in which the path can be located, including:
   means for dividing the configuration space into multiplicity of cells defined in terms of intervals in the degrees of freedom, including:
   means for partitioning a physical space into a multiplicity of sub-regions;
   means for calculating a change in a total volume of the sub-regions which contains at least a portion of the object when each one of the degrees of freedom is varied separately by one provisionally adapted unit of intervals; and
   means for determining the intervals for the degrees of freedom defining the cells in the configuration space in accordance with the calculated change;
   means for selecting cells which satisfy a prescribed condition, between the initial point and the final point; and
   means for checking an occurrence of a collision between the object and the surrounding obstacles in the selected cells;
   means for determining a collision-free path in the free space joining the initial point and the final point without the collision; and
   means for controlling a position of the physical object with respect to the physical obstacle according to the determined collision-free path.

11. The apparatus of claim 10, wherein all the sub-regions are identical in shape and volume.

12. The apparatus of claim 10, wherein the partitioning means uses a quad-tree when the physical space is considered to be 2-dimensional, and an oct-tree when the physical space is considered to be 3-dimensional.

13. The apparatus of claim 10, wherein the determining means determines the intervals on a basis of comparison between the calculated change and a prescribed reference value.

14. The apparatus of claim 13, wherein the detemining means determines the intervals such that, when the calculated change is greater than the prescribed reference value, the provisionally adapted unit of the intervals is reduced in proportion to a ratio of the prescribed reference value with respect to the calculated change.

15. An apparatus for collision-free path determination using free space enumeration, in which configurations of a physical object and surrounding physical obstacles are represented by a configuration space defined in terms of degrees of freedom of the object, the configuration space being divided up into a multiplicity of cells defined in terms of intervals in the degrees of freedom, in which a path of the object between a given initial point in the configuration space from which the motion starts and a given final point in the configuration space at which the path ends is to be determined, the apparatus comprising:
means for enumerating a continuous free space between the initial point and the final point in which the path can be located, including:
means for selecting cells which satisfy a prescribed condition, only between the initial point and the final point;
means for checking an occurrence of a collision between the object and the surrounding obstacles in the selected cells; and
means for memorizing positions in the configuration space of free space cells which are the selected cells for which the collision cannot be detected;
means for determining a collision-free path in the free space joining the initial point and the final point without the collision; and
means for controlling a position of the physical object with respect to the physical obstacle according to the determined collision-free path.

16. The apparatus of claim 15, wherein the memorizing means also memorizes positions in the configuration space of collision cells which are the selected cells for which the collision can be detected.

17. The apparatus of claim 15, wherein the configuration space is partitioned into blocks, each block containing a plurality of the cells, and wherein the memorizing means memorizes the positions in the configuration space of the blocks containing at least one of the free space cells, and positions in the blocks of the free space cells.

18. The apparatus of claim 17, wherein the memorizing means also memorizes positions in the configuration space of the blocks containing at least one of collision cells, where the collision cells are the selected cells for which the collision can be detected, and positions in the blocks of the collision cells.

19. The apparatus of claim 15, wherein the selecting means utilizes cell expansions.

20. The apparatus of claim 15, wherein the selecting means selects cells according to a heuristic function defined for each cell as $f = c + h$, where c is a number of cells from the initial point and h is an estimated number of cells to the final point, such that the cell for which the heuristic function takes a minimum value is selected in succession.

21. The apparatus of claim 20, wherein the estimated number of cells h at a particular cell is obtained as:

$$h = G \times \sqrt{\Sigma a(i) \times [c(i) - Fc(i)]^2}$$

where G is an overall coefficient, each a(i) is a coefficient for each degree of freedom of the object, c(i) is a value of i-th degree of freedom at the particular cell, and Fc(i) is a value of i-th degree of freedom at the final point.

22. The apparatus of claim 21, wherein at least one of the overall coefficient G and coefficients a(i) are determined within a prescribed range of values given for each.

23. The apparatus of claim 22, wherein those of the overall coefficient G and coefficients a(i) which are to be determined within a prescribed range of values given for each, are determined as a random number within the range.

24. The apparatus of claim 22, wherein the range is narrower for a coefficient which has a smaller difference between the initial point and the final point.

25. An apparatus for collision-free path determination using free space enumeration, in which configurations of a physical object and surrounding physical obstacles are represented by a configuration space defined in terms of their coordinates. in which a path of the object between a given initial point in the configuration space and a given final point in the configuration space is to be determined, the apparatus comprising:
means for enumerating a continuous free space between the initial point and the final point in which the collision between the object and the surrounding obstacles is not possible;
means for determining a collision-free path in the free space joining the initial point and the final point without the collision;
means for modifying the collision-free path: and
means for controlling a position of the physical object with respect to the physical obstacle according to the modified collision-free path.

26. The apparatus of claim 25, wherein the configuration space is divided up into a multiplicity of cells defined in terms of intervals in the coordinates. and wherein the enumerating means includes:
means for selecting cells only between the initial point and the final point;
means for detecting a collision between the object and the surrounding obstacles in the selected cells; and
means for memorizing positions in the configuration space of free space cells which are the selected cells for which the collision cannot be detected.

27. The apparatus of claim 26, wherein the memorizing means also memorizes positions in the configuration space of collision cells which are the selected cells for which the collision can be detected.

28. The apparatus of claim 25, wherein the modifying means includes:
means for designating a part of the free space as a dangerous part; and
means for adjusting the collision-free path such that the dangerous part is avoided by the collision-free path.

29. The apparatus of claim 28, wherein the deciding means utilizes wavefront expansions from the cells not in the free space.

30. The apparatus of claim 28, wherein the modifying means further includes means for expanding the free space further.

31. The apparatus of claim 30, wherein the expanding means utilizes wavefront expansion.

32. The apparatus of claim 31, wherein the expanding means utilizes a scanning window for the wavefront expansion.

33. An apparatus for collision-free area determination using free space enumeration, in which configurations of a physical object and surrounding physical obstacles are represented by a configuration space defined in terms of their coordinates, in which a location of the object between a given initial point in the configuration space and a given final point in the configuration space is to be determined, the apparatus comprising:
   means for enumerating a continuous free space between the initial point and the final point in which the object can be located;
   means for determining a collision-free area in the free space joining the initial point and the final point without the collision;
   means for modifying the collision-free area; and
   means for controlling a position of the physical object with respect to the physical obstacle according to the modified collision-free path.

34. The apparatus of claim 33, wherein the configuration space is divided up into a multiplicity of cells defined in terms of intervals in the coordinates, and wherein the enumerating means includes:
   means for selecting cells only between the initial point and the final point;
   means for detecting a collision between the object and the surrounding obstacles in the selected cells; and
   means for memorizing positions in the configuration space of free space cells which are the selected cells for which the collision cannot be detected.

35. The apparatus of claim 34, wherein the memorizing means also memorizes positions in the configuration space of collision cells which are the selected cells for which the collision can be detected.

36. The apparatus of claim 33, wherein the modifying means includes:
   means for designating a part of the free space as a dangerous part; and
   means for adjusting the collision-free area such that the dangerous part is avoided by the collision-free area.

37. The apparatus of claim 36, wherein the deciding means utilizes wavefront expansions from the cells not in the free space.

38. The apparatus of claim 36, wherein the modifying means further includes means for expanding the free space further.

39. The apparatus of claim 38, wherein the expanding means utilizes wavefront expansion.

40. The apparatus of claim 39, wherein the expanding means utilizes a scanning window for the wavefront expansion.

41. A method of collision-free path determination using free space enumeration, in which configurations of a physical object and surrounding physical obstacles are represented by a configuration space defined in terms of degrees of freedom of the object, the configuration space being divided up into a multiplicity of cells defined in terms of intervals in the degrees of freedom, in which a path of the object between a given initial point in the configuration space from which the path starts and a given final point in the configuration space at which the path ends is to be determined, the method comprising the steps of:
   enumerating a continuous free space between the initial point and the final point in which the path can be located, including the steps of:
   selecting cells which satisfy a prescribed condition, between the initial point and the final point, by simultaneously using a plurality of strategies for selecting the cells; and
   checking an occurrence of a collision between the object and the surrounding obstacles in the selected cells;
   determining a collision-free path in the free space joining the initial point and the final point without the collision; and
   controlling a position of the physical object with respect to the physical obstacle according to the determined collision-free path.

42. The method of claim 41, wherein all the selections by the plurality of strategies discontinues when the cells selected by one of the strategies succeed to connect the initial point and the final point continuously.

43. The method of claim 41, wherein the selecting step further including the steps of:
   inspecting progress of the selection by each of the plurality of strategies at intermediate points between the initial point and the final point; and
   deterring the selections by those strategies found by the inspections to be slower in progress than at least one of the other strategies.

44. The method of claim 43, wherein at the inspecting step a quantity P defined for a point in the configuration space by:

$$P = C^N / F$$

where C is a number of cells from the initial point, N is a dimensionality of the configuration space, and F is a total number of cells in the free space already enumerated, is utilized.

45. The method of claim 41, wherein at the selecting step the cells are selected according to a heuristic function defined for each cell as $f = c + h$, where c is a number of cells from the initial point and h is an estimated number of cells to the final point, such that the cell for which the heuristic function takes a minimum value is selected in succession; and wherein the different strategies being given by the estimated number of cells h estimated differently.

46. The method of claim 45, wherein the estimated number of cells h at a particular cell is obtained as:

$$h = G \times \sqrt{\Sigma a(i) \times [c(i) - Fc(i)]^2}$$

where G is an overall coefficient, each a(i) is a coefficient for each degree of freedom of the object, c(i) is a value of i-th degree of freedom at the particular cell, and Fc(i) is a value of i-th degree of freedom at the final point, and wherein the different strategies being given by at least one of the overall coefficient G and coefficients a(i) different from each other.

47. The method of claim 46, wherein at least one of the overall coefficient G and coefficients a(i) are determined within a prescribed range of values given for each.

48. The method of claim 47, wherein those of the overall coefficient G and coefficients a(i) which are to be determined within a prescribed range of values given for each, are determined as a random number within the range.

49. The method of claim 47, wherein the range is narrower for a coefficient which has a smaller difference between the initial point and the final point.

50. A method of collision-free path determination using free space enumeration, in which configurations of a physical object and surrounding physical obstacles are represented by a configuration space defined in terms of degrees of freedom of the object, the configuration space being divided up into a multiplicity of cells defined in terms of intervals in the degrees of freedom, in which a path of the object between a given initial point in the configuration space from which the path starts and a given final point in the configuration space at which the path ends is to be determined, the method comprising the steps of:
  enumerating a continuous free space between the initial point and the final point in which the path can be located, including the steps of:
  dividing the configuration space into multiplicity of cells defined in terms of intervals in the degrees of freedom, including the steps of:
  partitioning a physical space into multiplicity of sub-regions;
  calculating a change in a total volume of the sub-regions which contains at least a portion of the object when each one of the degrees of freedom is varied separately by one provisionally adapted unit of intervals; and
  determining the intervals for the degrees of freedom defining the cells in the configuration space in accordance with the calculated change;
  selecting cells which satisfy a prescribed condition, between the initial point and the final point; and
  checking an occurrence of a collision between the object and the surrounding obstacles in the selected cells;
  determining a collision-free path in the free space joining the initial point and the final point without the collision; and
  controlling a position of the physical object with respect to the physical obstacle according to the determined collision-free path.

51. The method of claim 50, wherein all the sub-regions are identical in shape and volume.

52. The method of claim 50, wherein at the partitioning step a use is made of a quad-tree when the physical space is considered to be 2-dimensional, and an oct-tree when the physical space is considered to be 3-dimensional.

53. The method of claim 50, wherein at the determining step the intervals are detemined on a basis of comparison between the calculated change and a prescribed reference value.

54. The method of claim 53, wherein at the detemining step the intervals are determined such that, when the calculated change is greater than the prescribed reference value, the provisionally adapted unit of the intervals is reduced in proportion to a ratio of the prescribed reference value with respect to the calculated change.

55. A method of collision-free path determination using free space enumeration, in which configurations of a physical object and surrounding physical obstacles are represented by a configuration space defined in terms of degrees of freedom of the object, the configuration space being divided up into a multiplicity of cells defined in terms of intervals in the degrees of freedom, in which a path of the object between a given initial point in the configuration space from which the path starts and a given final point in the configuration space at which the path ends is to be determined, the method comprising the steps of:
  enumerating a continuous free space between the initial point and the final point in which the path can be located, including the steps of:
  selecting cells which satisfy a prescribed condition, only between the initial point and the final point;
  checking an occurrence of a collision between the object and the surrounding obstacles in the selected cells; and
  memorizing positions in the configuration space of free space cells which are the selected cells for which the collision cannot be detected;
  determining a collision-free path in the free space joining the initial point and the final point without the collision; and
  controlling a position of the physical object with respect to the physical obstacle according to the determined collision-free path.

56. The method of claim 55, wherein at the memorizing step positions in the configuration space of collision cells which are the selected cells for which the collision can be detected are also memorized.

57. The method of claim 55, wherein the configuration space is partitioned into blocks, each block containing plurality of the cells, and wherein at the memorizing step the positions in the configuration space of the blocks containing at least one of the free space cells, and positions in the blocks of the free space cells are memorized.

58. The method of claim 57, wherein at the memorizing step positions in the configuration space of the blocks containing at least one of collision cells which are the selected cells for which the collision can be detected, and positions in the blocks of the collision cells are also memorized.

59. The method of claim 55, wherein at the selecting step cell expansions are utilized.

60. The method of claim 55, wherein at the selecting step the cells are selected according to a heuristic function defined for each cell as f=c+h, where c is a number of cells from the initial point and h is an estimated number of cells to the final point, such that the cell for which the heuristic function takes a minimum value is selected in succession.

61. The method of claim 60, wherein the estimated number of cells h at a particular cell is obtained as:

$$h = G \times \sqrt{\Sigma a(i) \times [c(i) - Fc(i)]^2}$$

where G is an overall coefficient, each a(i) is a coefficient for each degree of freedom of the object, c(i) is a value of i-th degree of freedom at the particular cell, and Fc(i) is a value of i-th degree of freedom at the final point.

62. The method of claim 61, wherein at least one of the overall coefficient G and coefficients a(i) are determined within a prescribed range of values given for each.

63. The method of claim 62, wherein those of the overall coefficient G and coefficients a(i) which are to be determined within a prescribed range of values given for each, are determined as a random number within the range.

64. The method of claim 62, wherein the range is narrower for a coefficient which has a smaller difference between the initial point and the final point.

65. A method of collision-free path determination using free space enumeration, in which configurations of a physical object and surrounding physical obstacles are represented by a configuration space defined in terms of degrees of freedom of the object, the configuration space being divided up into a multiplicity of cells defined in terms of intervals in the degrees of freedom, in which a path of the object between a given initial point in the configuration space from which the path starts and a given final point in the configuration space at which the path ends is to be planned, the method comprising the steps of:
 enumerating a continuous free space between the initial point and the final point in which the motion is possible;
 determining a collision-free path in the free space joining the initial point and the final point without the collision;
 modifying the collision-free path; and
 controlling a position of the physical object with respect to the physical obstacle according to the modified collision-free path.

66. The method of claim 65, wherein the enumerating step includes the steps of:
 selecting cells only between the initial point and the final point;
 checking an occurrence of a collision between the object and the surrounding obstacles in the selected cells; and
 memorizing positions in the configuration space of free space cells which are the selected cells for which the collision cannot be detected.

67. The method of claim 66, wherein at the memorizing step positions in the configuration space of collision cells which are the selected cells for which the collision can be detected are also memorized.

68. The method of claim 65, wherein the modifying step includes the steps of:
 designating a part of the free space as a dangerous part; and
 adjusting the collision-free path such that the dangerous part is avoided by the collision-free path.

69. The method of claim 68, wherein at the deciding step wavefront expansion from the cells not in the free space is utilized.

70. The method of claim 68, wherein the modifying step further includes the step of expanding the free space further.

71. The method of claim 70, wherein at the expanding step wavefront expansion is utilized.

72. The method of claim 71, wherein at the expanding step a scanning window is utilized for the wavefront expansion.

73. A method of collision-free area determination using free space enumeration, in which configurations of a physical object and surrounding physical obstacles are represented by a configuration space defined in terms of their coordinates, and in which a location of the object between a given initial point in the configuration space and a given final point in the configuration space is to be determined, the method comprising the steps of:
 enumerating a continuous free space between the initial point and the final point in which the object can be located;
 determining a collision-free area in the free space joining the initial point and the final point without the collision;
 modifying the collision-free area; and
 controlling a position of the physical object with respect to the physical obstacle according to the modified collision-free area.

74. The method of claim 73, wherein the configuration space being divided up into multiplicity of cells defined in terms of intervals in the coordinates, and wherein the enumerating step includes the steps of:
 selecting cells only between the initial point and the final point;
 checking an occurrence of a collision between the object and the surrounding obstacles in the selected cells; and
 memorizing positions in the configuration space of free space cells which are the selected cells for which the collision cannot be detected.

75. The method of claim 74, wherein at the memorizing step positions in the configuration space of collision cells which are the selected cells for which the collision can be detected are also memorized.

76. The method of claim 73, wherein the modifying step includes the steps of:
 designating a part of the free space as a dangerous part; and
 adjusting the collision-free area such that the dangerous part is avoided by the collision-free area.

77. The method of claim 76, wherein at the deciding step wavefront expansions from the cells not in the free space is utilized.

78. The method of claim 76, wherein the modifying step further includes the step of expanding the free space further.

79. The method of claim 78, wherein at the expanding means wavefront expansion is utilized.

80. The method of claim 79, wherein at the expanding means a scanning window for the wavefront expansion is utilized.

* * * * *